(12) United States Patent
Johnston et al.

(10) Patent No.: US 10,402,371 B2
(45) Date of Patent: *Sep. 3, 2019

(54) METHOD, APPARATUS AND COMPUTER PROGRAM PRODUCT FOR GENERATING EXTERNALLY SHARED COMMUNICATION CHANNELS

(71) Applicant: Slack Technologies, Inc., San Francisco, CA (US)

(72) Inventors: Elizabeth Johnston, San Francisco, CA (US); Andrew King, San Francisco, CA (US); Myles Grant, San Carlos, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,578

(22) Filed: Nov. 30, 2018

(65) Prior Publication Data

US 2019/0098087 A1    Mar. 28, 2019

Related U.S. Application Data

(63) Continuation-in-part of application No. 15/816,925, filed on Nov. 17, 2017, which is a continuation of application No. 15/655,634, filed on Jul. 20, 2017.

(51) Int. Cl.
*G06F 17/30* (2006.01)
*G06F 16/13* (2019.01)
(Continued)

(52) U.S. Cl.
CPC ............. *G06F 16/13* (2019.01); *G06F 16/27* (2019.01); *G06Q 10/10* (2013.01); *G06Q 10/107* (2013.01); *H04L 67/1097* (2013.01); *H04L 67/42* (2013.01)

(58) Field of Classification Search
CPC ...... G06F 16/13; G06F 16/27; G06F 3/04817; G06F 3/0482; H04L 12/1822; H04L 67/1097; H04L 67/42; G06Q 10/10
See application file for complete search history.

(56) References Cited

U.S. PATENT DOCUMENTS 6,248,946 B1   6/2001   Dwek
6,374,336 B1   4/2002   Peters et al.
(Continued)

OTHER PUBLICATIONS

Slackline-Shared Channels across Slack teams [online][retrieved Oct. 2, 2017]. Retrieved from the Internet: <URL:https://web.archive.org/web/20170630031530/https://slackline.io/>. (Jun. 30, 2017) 4 pages.

(Continued)

*Primary Examiner* — Shew Fen Lin
(74) *Attorney, Agent, or Firm* — Alston & Bird, LLP

(57) ABSTRACT

Computing systems, apparatuses, computer-implemented methods, and computer program products are disclosed for creating a shared communication channel in a group-based communication platform having a plurality of database shards. An example computer-implemented method includes generating a shared communication channel shard that is assigned a shared communication channel identification, a first set of shared communication channel attributes associated with a first group identification, and a second set of shared communication channel attributes associated with a second group identification. The method further includes generating first and second externally shared group-based shared communication channel interfaces based on the first and second sets of shared communication channel attributes, respectively. The method further includes transmitting the first and second externally shared group-based shared communication channel interfaces to a first client device asso- (Continued)

ciated with the first group identification and a second client device associated with the second group identification, respectively.

30 Claims, 11 Drawing Sheets

(51) Int. Cl.
*H04L 29/08* (2006.01)
*G06F 16/27* (2019.01)
*G06Q 10/10* (2012.01)
*H04L 29/06* (2006.01)

(56) References Cited

U.S. PATENT DOCUMENTS

| | | | |
|---|---|---|---|
| 6,718,361 B1 | 4/2004 | Basani et al. | |
| 7,426,540 B1 | 9/2008 | Matsumoto et al. | |
| 7,644,144 B1 * | 1/2010 | Horvitz | G06Q 10/10 709/203 |
| 7,730,094 B2 | 6/2010 | Kaler et al. | |
| 8,185,448 B1 | 5/2012 | Myslinski | |
| 9,160,550 B1 * | 10/2015 | Morrison | G06F 16/951 |
| 9,940,394 B1 | 4/2018 | Grant et al. | |
| 2003/0084020 A1 | 5/2003 | Shu | |
| 2005/0171811 A1 | 8/2005 | Campbell et al. | |
| 2006/0041661 A1 | 2/2006 | Erikson et al. | |
| 2007/0261102 A1 | 11/2007 | Spataro et al. | |
| 2008/0104665 A1 | 5/2008 | Naldurg et al. | |
| 2008/0183975 A1 | 7/2008 | Foster et al. | |
| 2010/0246535 A1 | 9/2010 | Lindner | |
| 2011/0137991 A1 * | 6/2011 | Russell | G06Q 10/06 709/204 |
| 2012/0246228 A1 * | 9/2012 | Udezue | H04L 12/1859 709/204 |
| 2013/0325962 A1 * | 12/2013 | Verma | H04L 67/1044 709/204 |
| 2014/0012814 A1 | 1/2014 | Bercovici et al. | |
| 2015/0169253 A1 | 6/2015 | Donlan | |
| 2015/0282102 A1 | 10/2015 | Kakishima et al. | |
| 2015/0358234 A1 * | 12/2015 | Krieger | H04W 4/80 709/235 |
| 2016/0259797 A1 | 9/2016 | Lewis et al. | |
| 2016/0306854 A1 | 10/2016 | Hegde et al. | |
| 2017/0103116 A1 | 4/2017 | Hu et al. | |
| 2017/0109013 A1 | 4/2017 | Hong | |
| 2017/0169800 A1 * | 6/2017 | Greco | G06F 3/0482 |
| 2018/0046730 A1 | 2/2018 | De et al. | |
| 2018/0197144 A1 | 7/2018 | Frank et al. | |
| 2018/0314750 A1 | 11/2018 | Merriman et al. | |
| 2019/0028287 A1 | 1/2019 | Jin et al. | |

OTHER PUBLICATIONS

Quinde—Share channels between Slack teams [online][retrieved Oct. 2, 2017]. Retrieved from the Internet: <URL:https://quinde.io/> . 3 pages.

ISA/206—Invitation to Pay Additional Fees Mailed on Aug 29, 2018 for WO Application No. PCT/US18/043101.

International Search Report and Written Opinion for corresponding International Application No. PCT/US2018/043101, dated Nov. 8, 2018, 15 pages.

Frequent questions—Slackline [online][retrieved Oct. 2, 2017]. Retrieved from the Internet: <URL:https://web.archive.org/web/20170606091157/https://slackline.io/faqs>. (Jun. 6, 2017) 3 pages.

* cited by examiner

METHOD, APPARATUS AND COMPUTER PROGRAM PRODUCT FOR GENERATING EXTERNALLY SHARED COMMUNICATION CHANNELS

The present application is a continuation-in-part of U.S. patent application Ser. No. 15/816,925, titled "METHOD, APPARATUS AND COMPUTER PROGRAM PRODUCT FOR GENERATING EXTERNALLY SHARED COMMUNICATION CHANNELS," filed Nov. 17, 2017, which is a continuation of U.S. patent application Ser. No. 15/655,634, titled "METHOD, APPARATUS AND COMPUTER PROGRAM PRODUCT FOR GENERATING EXTERNALLY SHARED COMMUNICATION CHANNELS," filed Jul. 20, 2017, the contents of which are incorporated herein by reference in their entirety.

BACKGROUND

Various systems are configured to create externally shared communication channels. Applicant has identified many deficiencies and problems associated with existing systems. Through applied effort, ingenuity, and innovation, many of these identified deficiencies and problems have been solved by developing solutions that are in accordance with the embodiments of the present disclosure, many examples of which are described in detail herein.

BRIEF SUMMARY

In general, embodiments of the present disclosure provide methods, apparatus, systems, computing devices, and/or the like for generating externally shared communication channels.

In one example embodiment, a computing system is provided for creating a shared communication channel in a group-based communication platform. The group-based communication platform may comprise a plurality of database shards. The computing system may comprise communications circuitry configured to receive, from a first client device associated with an initiator group identification, a shared communication channel generation query associated with the initiator group identification and a target group identification. The communications circuitry may be further configured to transmit, to a second client device associated with the target group identification, a shared communication channel acceptance request. The communications circuitry may be further configured to receive a shared communication channel acceptance notification. The communications circuitry may be further configured to transmit, to the first client device, a first externally shared group-based shared communication channel interface of the shared communication channel. The communications circuitry may be further configured to transmit, to the second client device, a second externally shared group-based shared communication channel interface of the shared communication channel. The computing system may further comprise database circuitry in communication with the communications circuitry. The database circuitry may be configured to receive, from the communications circuitry, the shared communication channel generation query. The database circuitry may be further configured to generate a shared communication channel shard. The plurality of database shards may comprise the shared communication channel shard. The shared communication channel shard may be assigned a shared communication channel identification, a first set of shared communication channel attributes associated with the initiator group identification, and a second set of shared communication channel attributes associated with the target group identification. The database circuitry may be further configured to generate the shared communication channel acceptance request. The shared communication channel acceptance request may be associated with the shared communication channel identification. The database circuitry may be further configured to transmit, to the communications circuitry for transmission to the second client device associated with the target group identification, the shared communication channel acceptance request. The database circuitry may be further configured to receive, from the communications circuitry, the shared communication channel acceptance notification. The shared communication channel acceptance notification may comprise an electronic approval to associate the shared communication channel identification with the target group identification. The computing system may further comprise referential table generation circuitry in communication with the communications circuitry, the database circuitry, and a main database. The main database may comprise a shard referential table. The referential table generation circuitry may be configured to update the shard referential table based on the initiator group identification, the target group identification, the shared communication channel identification, the first set of shared communication channel attributes, and the second set of shared communication channel attributes. The computing system may further comprise interface generation circuitry in communication with the communications circuitry, the database circuitry, and the referential table generation circuitry. The interface generation circuitry may be configured to generate the first externally shared group-based shared communication channel interface of the shared communication channel based on the shared communication channel shard and the first set of shared communication channel attributes associated with the initiator group identification. The interface generation circuitry may be configured to generate the second externally shared group-based shared communication channel interface of the shared communication channel based on the shared communication channel shard and the second set of shared communication channel attributes associated with the target group identification. The interface generation circuitry may be configured to transmit, to the communications circuitry for transmission to the first client device, the first externally shared group-based shared communication channel interface of the shared communication channel. The interface generation circuitry may be further configured to transmit, to the communications circuitry for transmission to the second client device, the second externally shared group-based shared communication channel interface of the shared communication channel.

In another example embodiment, a computer-implemented method is provided for creating a shared communication channel in a group-based communication platform. The group-based communication platform may comprise a plurality of database shards. The computer-implemented method may comprise receiving, by communications circuitry from a first client device associated with an initiator group identification, a shared communication channel generation query associated with the initiator group identification and a target group identification. The computer-implemented method may further comprise generating, by database circuitry in communication with the communications circuitry, a shared communication channel shard. The plurality of database shards may comprise the shared communication channel shard. The shared communication channel shard may be assigned a shared communication channel identification, a first set of shared communication channel attributes associated with the initiator group identification, and a second set of shared communication channel attributes associated with the target group identification. The computer-implemented method may further comprise generating, by the database circuitry, a shared communication channel acceptance request. The shared communication channel acceptance request may be associated with the shared communication channel identification. The computer-implemented method may further comprise transmitting, by the communications circuitry to a second client device associated with the target group identification, the shared communication channel acceptance request. The computer-implemented method may further comprise receiving, by the communications circuitry, a shared communication channel acceptance notification. The shared communication channel acceptance notification may comprise an electronic approval to associate the shared communication channel identification with the target group identification. The computer-implemented method may further comprise updating, by referential table generation circuitry in communication with the communications circuitry, the database circuitry, and a main database, a shard referential table based on the initiator group identification, the target group identification, the shared communication channel identification, the first set of shared communication channel attributes, and the second set of shared communication channel attributes. The main database may comprise the shard referential table. The computer-implemented method may further comprise generating, by interface generation circuitry in communication with the communications circuitry, the database circuitry, and the referential table generation circuitry, a first externally shared group-based shared communication channel interface of the shared communication channel based on the shared communication channel shard and the first set of shared communication channel attributes associated with the initiator group identification. The computer-implemented method may further comprise generating, by the interface generation circuitry, a second externally shared group-based shared communication channel interface of the shared communication channel based on the shared communication channel shard and the second set of shared communication channel attributes associated with the target group identification. The computer-implemented method may further comprise transmitting, by the communications circuitry to the first client device, the first externally shared group-based shared communication channel interface of the shared communication channel. The computer-implemented method may further comprise transmitting, by the communications circuitry to the second client device, the second externally shared group-based shared communication channel interface of the shared communication channel.

In another example embodiment, a computer program product is provided for creating a shared communication channel in a group-based communication platform. The group-based communication platform may comprise a plurality of database shards. The computer program product may comprise at least one non-transitory computer-readable storage medium storing computer-executable program code instructions that, when executed by a computing system, cause the computing system to receive, by communications circuitry from a first client device associated with an initiator group identification, a shared communication channel generation query associated with the initiator group identification and a target group identification. The computer-executable program code instructions, when executed by the computing system, may further cause the computing system to generate, by database circuitry in communication with the communications circuitry, a shared communication channel shard. The plurality of database shards may comprise the shared communication channel shard. The shared communication channel shard may be assigned a shared communication channel identification, a first set of shared communication channel attributes associated with the initiator group identification, and a second set of shared communication channel attributes associated with the target group identification. The computer-executable program code instructions, when executed by the computing system, may further cause the computing system to generate, by the database circuitry, a shared communication channel acceptance request. The shared communication channel acceptance request is associated with the shared communication channel identification. The computer-executable program code instructions, when executed by the computing system, may further cause the computing system to transmit, by the communications circuitry to a second client device associated with the target group identification, the shared communication channel acceptance request. The computer-executable program code instructions, when executed by the computing system, may further cause the computing system to receive, by the communications circuitry, a shared communication channel acceptance notification. The shared communication channel acceptance notification may comprise an electronic approval to associate the shared communication channel identification with the target group identification. The computer-executable program code instructions, when executed by the computing system, may further cause the computing system to update, by referential table generation circuitry in communication with the communications circuitry, the database circuitry, and a main database, a shard referential table based on the initiator group identification, the target group identification, the shared communication channel identification, the first set of shared communication channel attributes, and the second set of shared communication channel attributes. The main database may comprise the shard referential table. The computer-executable program code instructions, when executed by the computing system, may further cause the computing system to generate, by interface generation circuitry in communication with the communications circuitry, the database circuitry, and the referential table generation circuitry, a first externally shared group-based shared communication channel interface of the shared communication channel based on the shared communication channel shard and the first set of shared communication channel attributes associated with the initiator group identification. The computer-executable program code instructions, when executed by the computing system, may further cause the computing system to generate, by the interface generation circuitry, a second externally shared group-based shared communication channel interface of the shared communication channel based on the shared communication channel shard and the second set of shared communication channel attributes associated with the target group identification. The computer-executable program code instructions, when executed by the computing system, may further cause the computing system to transmit, by the communications circuitry to the first client device, the first externally shared group-based shared communication channel interface of the shared communication channel. The computer-executable program code instructions, when executed by the computing system, may further cause the computing system to transmit, by the communications circuitry to the second client device, the second externally shared group-based shared communication channel interface of the shared communication channel.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

Figure 1:
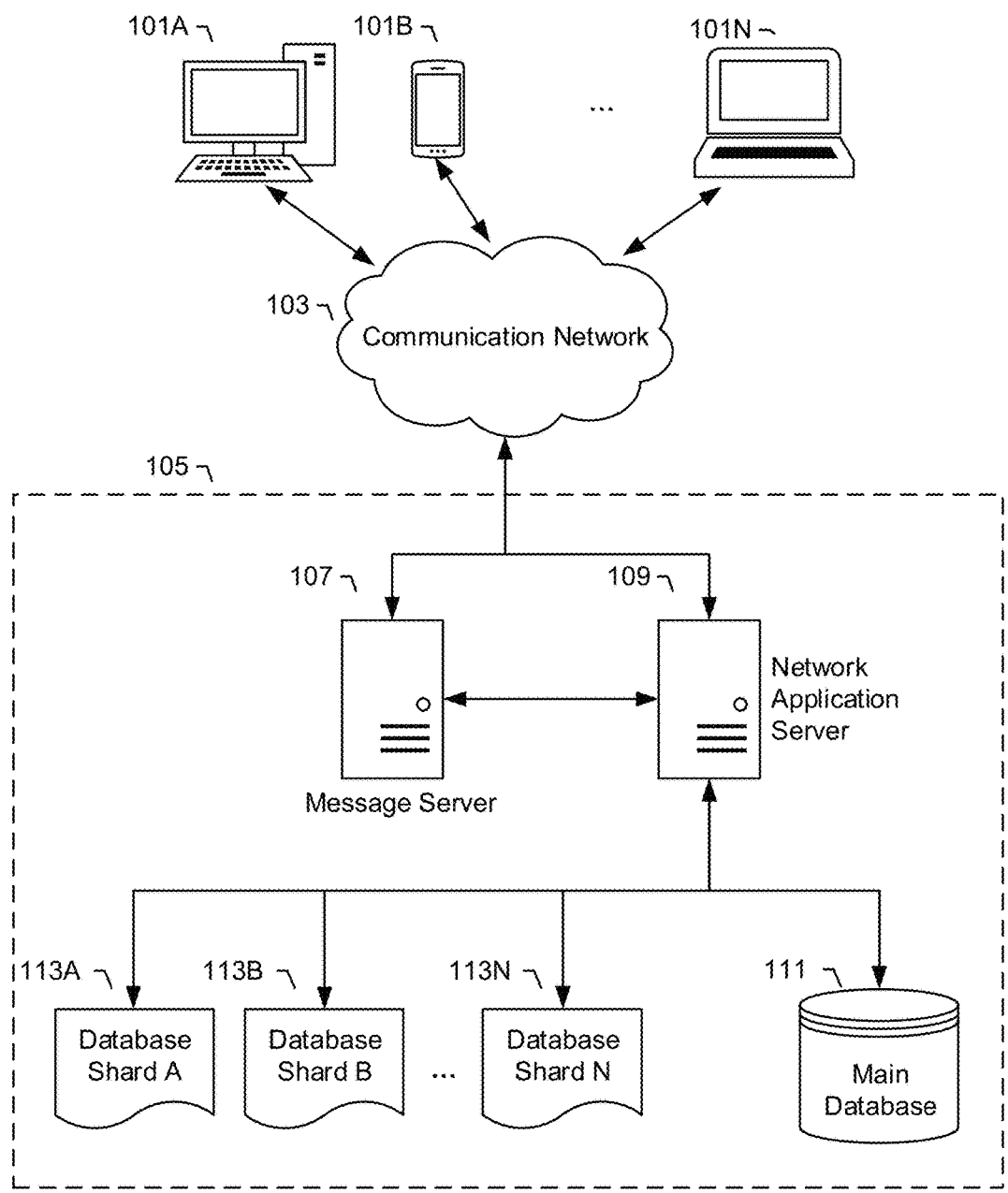

Having thus described some example embodiments in general terms, references will now be made to the accompanying drawings, which illustrate example embodiments and features of the present disclosure and are not necessarily drawn to scale. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

Figure 2:
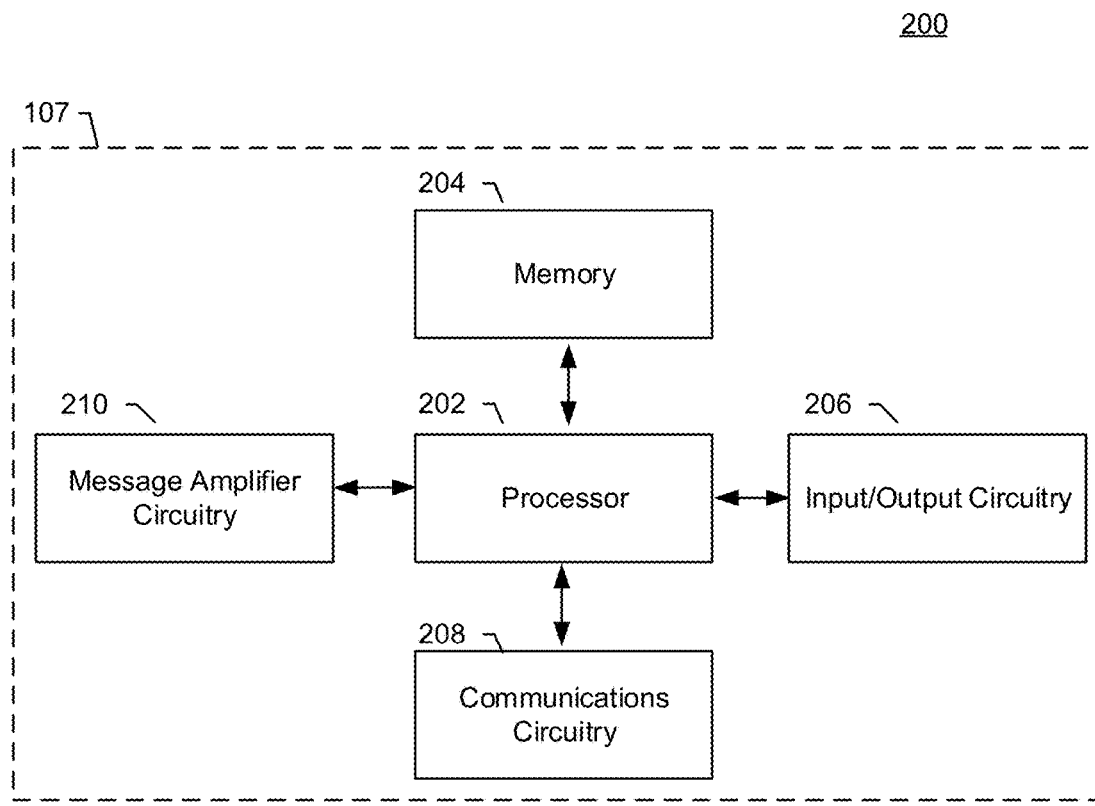
Figure 3:
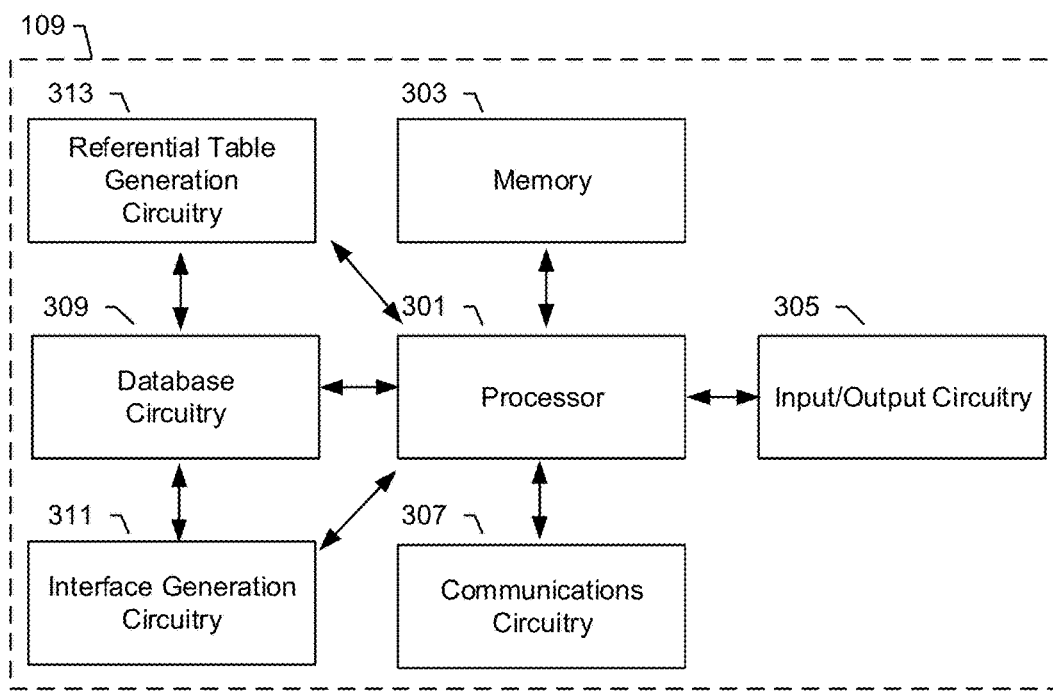
Figure 4:
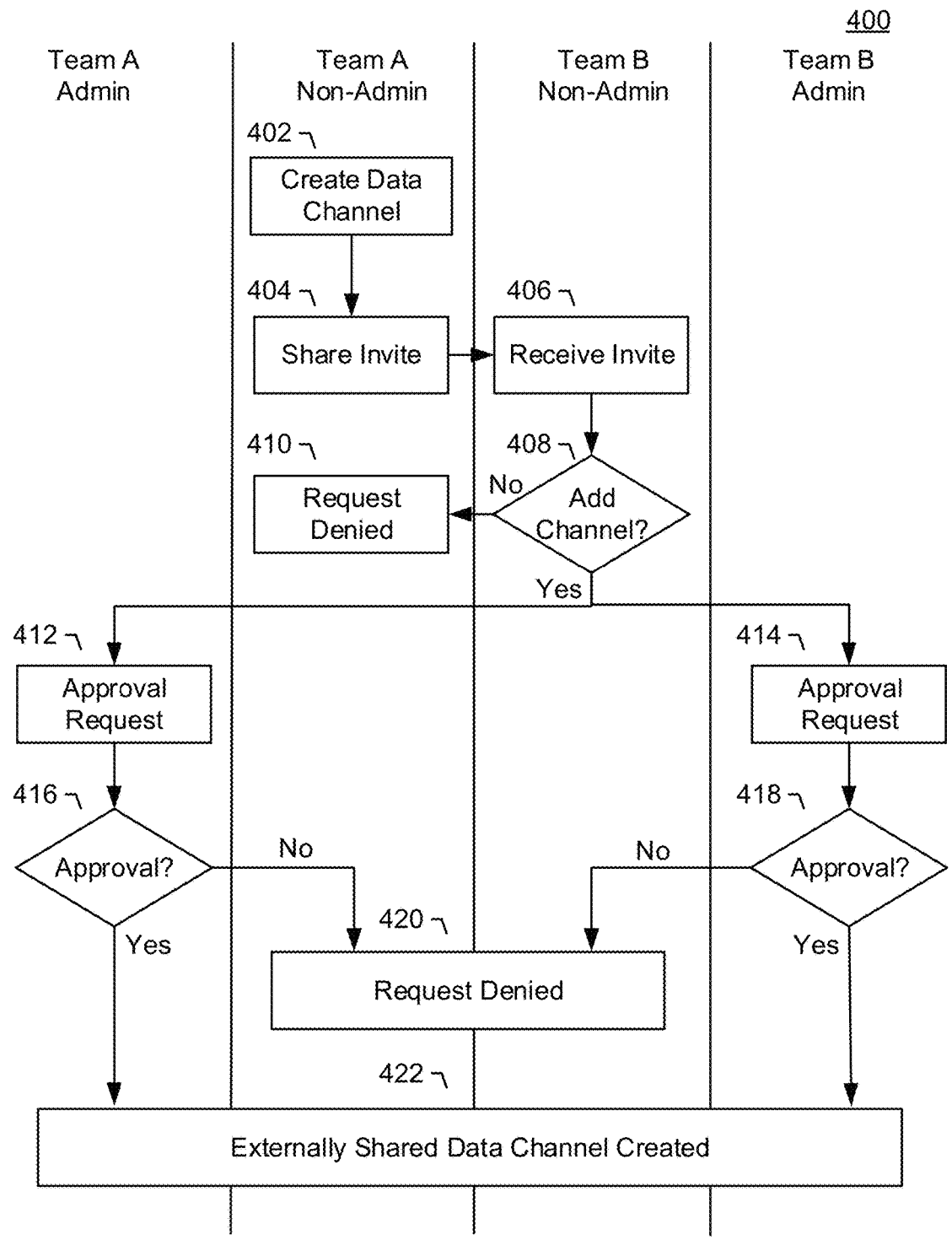
Figure 5:
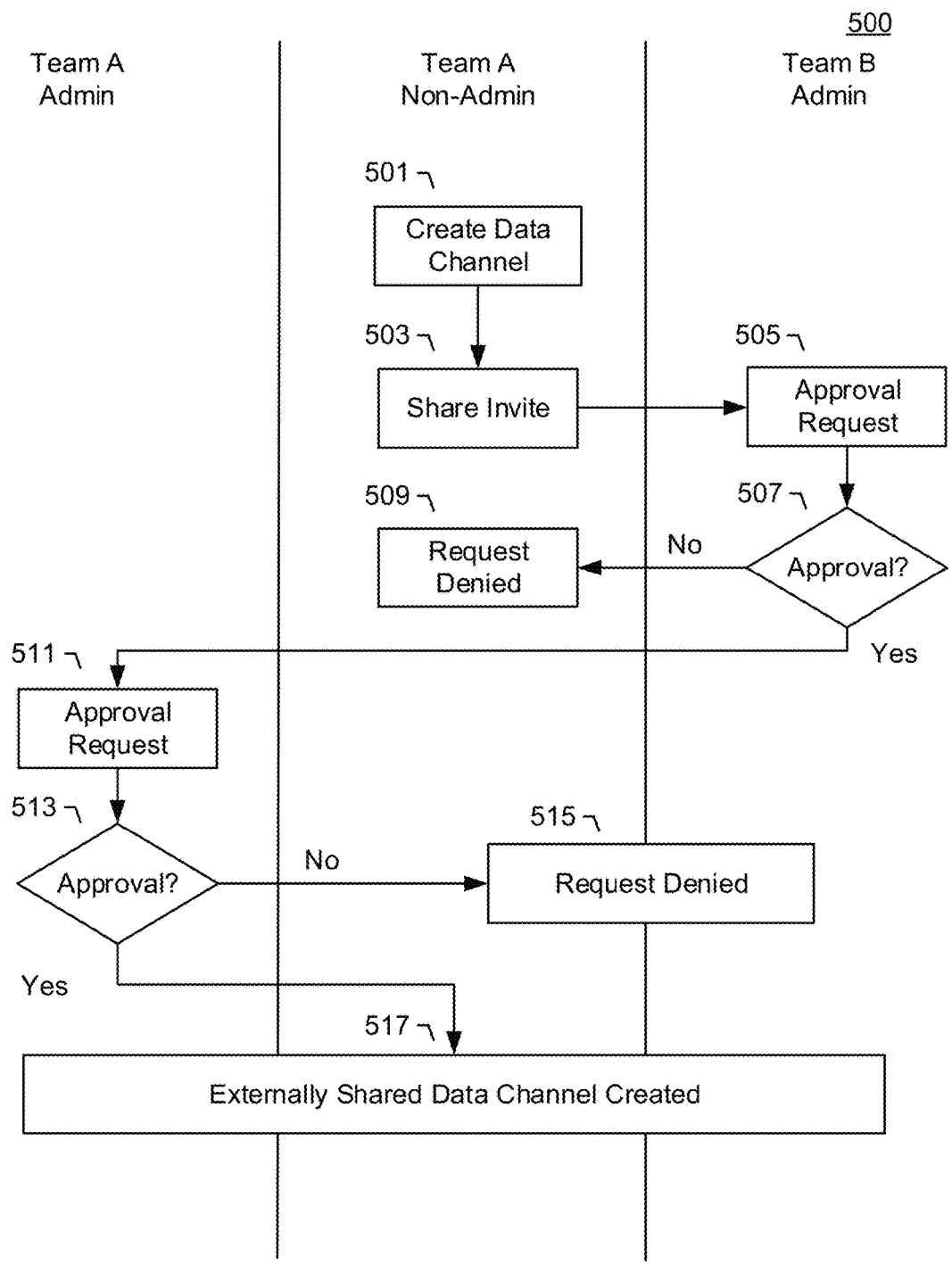
Figure 6:
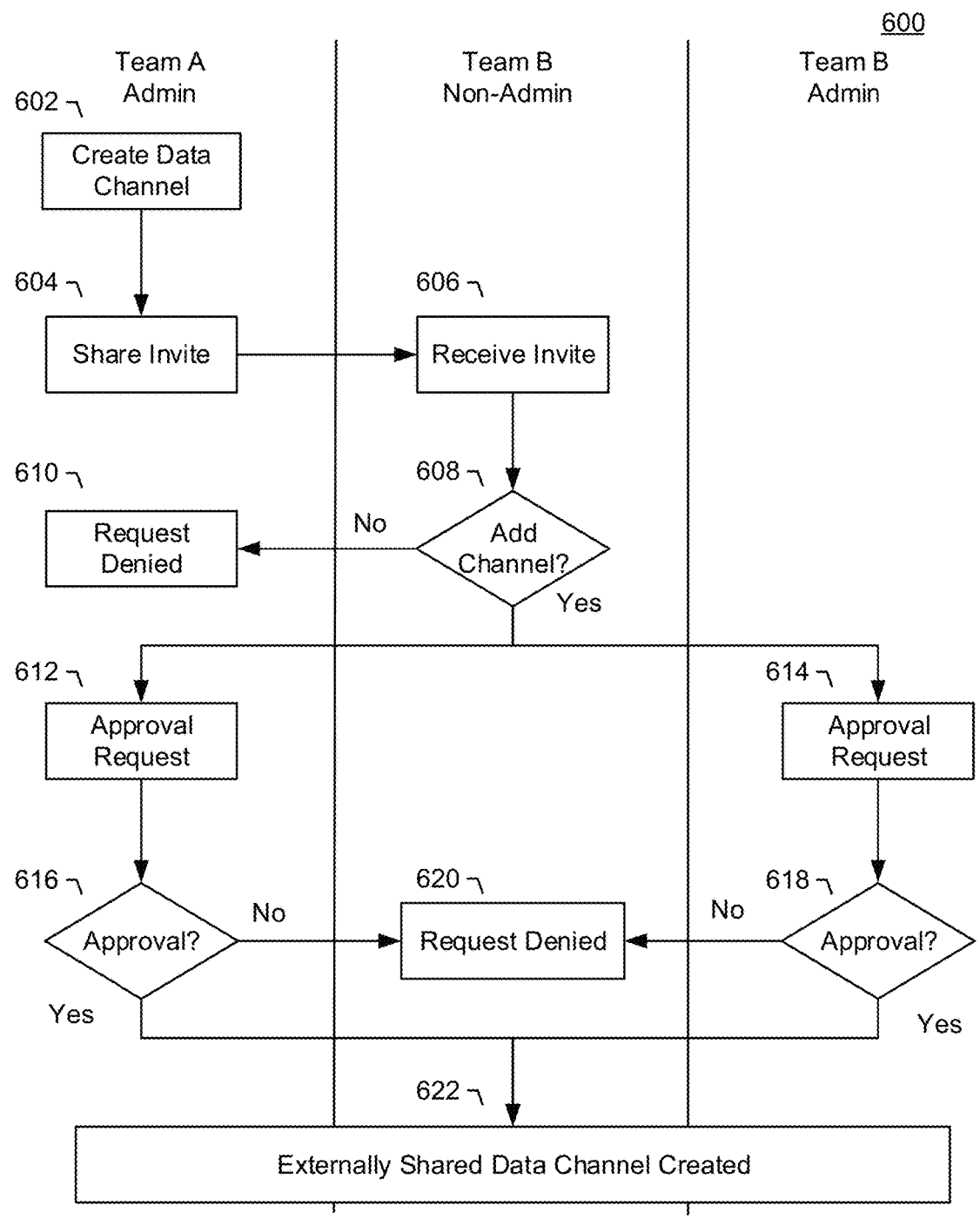
Figure 7:
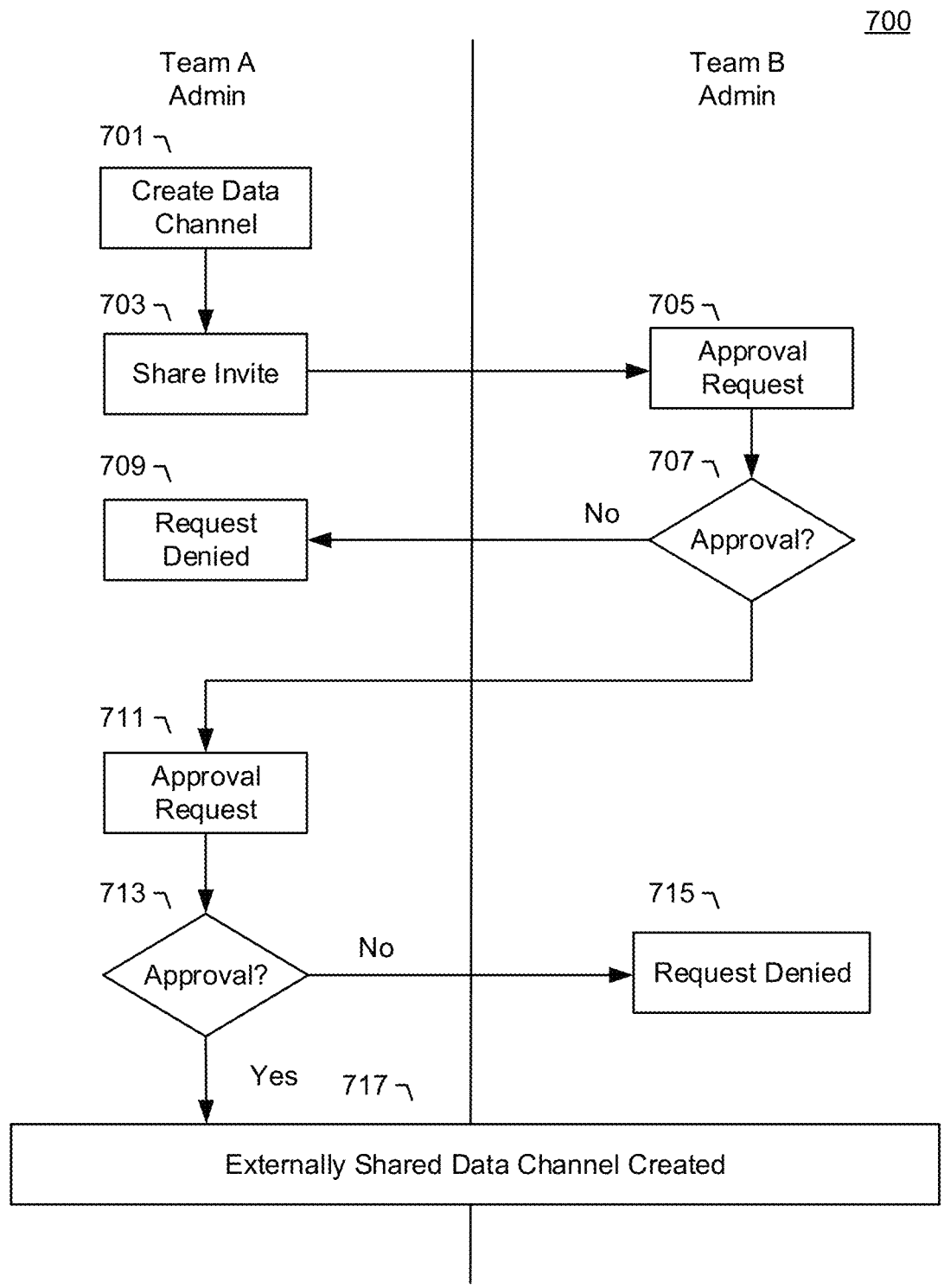

FIG. 1 illustrates an example system architecture diagram of a group-based communication platform in accordance with some example embodiments of the present disclosure;

FIG. 2 illustrates an example schematic diagram of a message server in accordance with some example embodiments of the present disclosure;

FIG. 3 illustrates an example schematic diagram of a network application server in accordance with some example embodiments of the present disclosure;

FIG. 4 illustrates an example flow chart illustrating an example method in accordance with some example embodiments of the present disclosure;

FIG. 5 illustrates an example flow chart illustrating an example method in accordance with some example embodiments of the present disclosure;

FIG. 6 illustrates an example flow chart illustrating an example method in accordance with some example embodiments of the present disclosure;

FIG. 7 illustrates an example flow chart illustrating an example method in accordance with some example embodiments of the present disclosure; and FIGS. 8A, 8B, 8C, and 8D illustrate various elements of example user interfaces in accordance with some example embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout.

Overview

Various embodiments of the disclosure relate generally to the creation of externally shared communication channels in a group-based communication platform. The group-based communication platform is configured to communicate with a plurality of client devices and operates a plurality of network databases. Each of the client devices may be associated with a group identification, which may indicate a group or an organization that the client device is associated with. For example, a particular organization may have a plurality of client devices connected to a group-based communication platform, and the group-based communication platform identifies each client device as being associated with that particular organization.

The group-based communication platform also includes a plurality of database shards, and each database shard stores data related to a particular group identification. For example, a database shard may store electronic communication data associated with members of a particular organization, which enables members of that particular organization to communicate and exchange data with other members of the same organization in real-time. In this example, the organization itself is the owner of the database shard, and has control over where and how the related data is stored. This simplifies many technical tasks, such as data retention, unfurling, and integration settings.

However, existing systems and approaches are plagued by many technical restrictions and limitations, as they do not provide support for data exchange and communication between different organizations, as each database shard can only be owned by a single organization. For example, when a user Tony of organization X intends to share data (stored in the organization X's database shard) with another user Frank of organization Y, Tony will have to exchange said data through other communication means, which may cause communication delays and inefficiencies. As data can be time-sensitive and dynamic in nature, technical limitations of existing systems may compromise data integrity and deplete network resources.

In addition, existing systems are not configured to manage user identities in externally shared communication channels. For example, Tony may be a member of both organization X and organization Z. Tony may have an identity ("Tony-X") associated with communication channels in organization X, and another identity ("Tony-Z") associated with communication channels in organization Z. In an externally shared communication channel connecting organization X and organization Z, existing systems are unable to reconcile "Tony-X" and "Tony-Z," and may falsely determine that "Tony-X" and "Tony-Z" are two different individuals. Existing systems may determine Tony as a member at organization X, but as an individual or a guest at organization Z, which may create conflicts in data management.

Systems structured in accordance with various embodiments of the disclosure overcome challenges faced by existing systems.

Continuing from the "Tony to Frank" discussion above, Tony in a group-based communication platform (e.g. a cloud-based group collaboration tool provided by SLACK®) that is structured in accordance with various embodiments of the disclosure is able to exchange data in real-time with Frank through an externally shared communication channel. In other words, members of organization X and organization Y are able to view content and share data in the externally shared communication channel in some instances as if they belong to the same organization and in other instances as if they belong to different organizations (e.g., "one-sided viewing" as described below). Network applications and other software integrations continue to work in the externally shared communication channel, and each organization maintains its own preferences that apply to its respective channel experience.

Continuing from the "Tony-X/Tony-Z" discussion above, in a group-based communication platform that is structured in accordance with various embodiments of the disclosure, Tony is assigned an unified identity that recognizes Tony as a member of both organization X and organization Z. In other words, the cloud-based group collaboration tool provided by SLACK® is able to create union of identities that may recognize individuals as members of separate teams.

From the user experience perspective, systems structured in accordance with various embodiments of the disclosure greatly enhance organizational productivity and efficiency. They also reduce the need for other forms of communications (such as electronic mail), and provide better collaboration between different organizations while eliminating channel disconnections between teams. In addition, they are configured to provide asymmetrical and customizable privacy settings, where an externally shared communication channel between two teams may have one privacy configuration for one team and a different configuration for the other team. Further, externally shared communication channels may create cross-network effects, which increases user retention rates from different organizations or different groups.

From the developer's perspective, systems structured in accordance with various embodiments of the disclosure provide support for the retrieval and appropriate visibility (e.g., based on shared communication channel attributes, viewing privilege settings, or both) of data, while providing the flexibility of retention settings. They also enable the selective connection of channels, as well as teams based on channels.

In some embodiments, the group-based communication platform may provide for "one-sided viewing" with shared communication channel attributes (e.g., name, purpose, topic), shared communication channel controls (e.g., access controls, viewing privilege settings), and shared communication channel interfaces that are configurable to be different on each side of the externally shared communication channel. For example, the shared communication channel attributes, controls, and interfaces on each side of the externally shared communication channel may be configurable by a user, administrator, or the system (e.g., automatically and without user interaction). For example, even though the system maintains the sharding for the externally shared communication channel, the attributes, controls, and interfaces of the externally shared communication channel may be different on each side so that a first organization (e.g., an agency having many people flowing in and out of the externally shared communication channel) that needs the externally shared communication channel to be public can share the externally shared communication channel with a second organization (e.g., a company creating a private document) that needs the externally shared communication channel to be private. In some instances, these attributes and controls architecturally may be included in a single table but split out into attributes per organization or team. Such "one-sided viewing" provided by the group-based communication platform allows for messages, attachments, and content communicated over the externally shared communication channel to be "public" for members of the first organization and "private" for members of the second organization. In an illustrative example, the system may provide equal control over attributes around name so that organizations with different workflows may utilize different names for the externally shared communication channel. For example, the externally shared communication channel may have a different name that is actively being used by the members of each organization.

In one illustrative example, the organization X side of the externally shared communication channel may have different attributes and controls and a different interface than the organization Y side of the externally shared communication channel. In another illustrative example, the group-based communication platform provides for a member of organization X to broadcast (e.g., by a message server in real-time) a public message over the externally shared communication channel to members of both organization X and organization Y. The group-based communication platform further provides for a member of organization Y to transmit (e.g., by the message server in real-time) a private message over the externally shared communication channel to members of organization Y but not to members of organization X. The group-based communication platform further provides for storing (e.g., by a network application server) the public message and the private message in a main database and allowing (e.g., by the network application server) members of either organization X or organization Y to search for and access the public message while allowing (e.g., by the network application server) only members of organization Y to search for and access the private message. For example, the group-based communication platform may: index a public message transmitted by a member of organization X or organization Y in a shared index accessible to members of organization X and members of organization Y; index a private message transmitted by a member of organization X in a first separate index accessible to members of organization X but not accessible to members of organization Y; and index a private message transmitted by a member of organization Y in a second separate index accessible to members of organization Y but not accessible to members of organization X.

In some embodiments, the group-based communication platform may store the attributes and controls of the externally shared communication channel architecturally in a single table but split out the stored attributes and controls into attributes and controls per organization. For example, the group-based communication platform may store the privacy or publicness of a channel as an attribute in a channel row of an association table stored in a database. For shared communication channels, the group-based communication platform may generate a separate association table per organization. The group-based communication platform may store in the channel row all of the static information (e.g., facts that cannot be changed or configured by a user) for the shared communication channel, such as when the shared communication channel was created, when the shared communication channel was last updated, who made the shared communication channel, and the like. In some embodiments, the group-based communication platform may generate a separate association table for the shared communication channel that comprises the configurable attributes and controls per organization (e.g., per each of the two or more organizations that are in the shared communication channel). For example, the group-based communication platform may generate an association table having two or more rows (e.g., one row for each of the two or more organizations in the shared communication channel) comprising data indicative of those attributes and controls, serialized down to the clients. The group-based communication platform may generate different user interfaces for the shared communication channel based on the attributes and controls for each organization in the shared communication channel. In some instances, one organization in the shared communication channel will not know if another organization in the shared communication channel has different settings, attributes, or controls.

In some embodiments, continuing from the "Tony to Frank" discussion above, the organization X side of the externally shared communication channel may have different attributes and controls and a different interface than the organization Y side of the externally shared communication channel. In some embodiments, the group-based communication platform provides for a member of organization X (e.g., Tony) to broadcast (e.g., by a message server in real-time) a public message over the externally shared communication channel to members of both organization X and organization Y. The group-based communication platform further provides for a member of organization Y (e.g., Frank) to transmit (e.g., by the message server in real-time) a private message over the externally shared communication channel to members of organization Y but not to members of organization X. The group-based communication platform further provides for storing (e.g., by a network application server) the public message and the private message in a main database and allowing (e.g., by the network application server) members of either organization X or organization Y to search for and access the public message while allowing (e.g., by the network application server) only members of organization Y to search for and access the private message. For example, the group-based communication platform may permit Tony and Frank to search for and access the public message while permitting Frank, but not Tony, to search for and access the private message.

In some embodiments, if organization Y has configured the shared communication channel to be private, and if Frank changes the topic of the shared communication channel, the real-time messaging server (e.g., the message server 107, the apparatus 200) disclosed herein may be configured to broadcast that change as a message (e.g., a private general message) in the shared communication channel only to organization Y but not to organization X. Further the network application server (e.g., the network application server 109, the apparatus 300) disclosed herein may be configured to store and provide search access to that change as history (e.g., a private storage message) in the shared communication channel only to organization Y but not to organization X. As a result, only one side, organization Y, will be able to see that information.

In some embodiments, the group-based communication platform provides for non-transitory "ephemeral" messages (e.g., private general messages and private storage messages that are viewable and searchable only by client devices associated with the correct group identification). The group-based communication platform provides techniques for the message server, the network application server, and any other suitable components to receive, transmit, store, and retrieve data with an awareness of: (i) messages that only a particular member may see (e.g., if a member performs an action that results in an error, the group-based communication platform may transmit the message directly to, and only to, that member); (ii) ephemeral messages that are configured to exist (e.g., to be transmitted, viewed, stored, searched, retrieved) on only one side of the shared communication channel; and (iii) messages that are broadcast to all members of the shared communication channel.

In some embodiments, the group-based communication platform provides for generating the aforementioned non-transitory "ephemeral" messages by annotating the messages in order for the storage (e.g., the network application server) to determine whether or not to retrieve the messages for one side, for the other side, or for both sides of the shared communication channel. The group-based communication platform provides for electronically (and without user input) analyzing, by the message server, the annotations and determining, based on the annotations, whether to broadcast the messages to one side, to the other side, or to both sides of the shared communication channel. Accordingly, the group-based communication platform provides for real-time viewing (e.g., by the real-time messaging server) of the messages as well as historical and search-based viewing (e.g., by the network application server) of the messages. For example, a member of one side of the shared communication channel may receive, in real-time from the real-time messaging server, an ephemeral message viewable only on that side of the shared communication channel. Subsequently, the member may refresh the member's user interface. The member then may receive the ephemeral message from the network application server (e.g., the ephemeral message now is coming from the main database through the network application server and not from the real-time messaging server).

In some embodiments, the group-based communication platform provides for a sharding database comprising a plurality of database shards. In some embodiments, the group-based communication platform may shard on team. For example, the group-based communication platform may store: one organization's data in a first database shard; the other organization's data in a second database shard; and the shared communication channel in a third database shard. In some embodiments, the group-based communication platform may provide for access control using a permission hopping technique.

In some embodiments, the group-based communication platform may shard on channel. For example, the access control may be around which organizations can access a particular channel in a shard that includes multiple different channels associated with multiple different organizations. In one illustrative example, a shard comprising channels A, B, C, D, E, and F may be shared by organizations X, Y, and Z. Channels A and B in the shard may be associated with organization X, where channel A is accessible by only organization X, and where channel B is accessible by organizations X, Y, and Z. Channel C in the shard may be associated with organization Y and accessible by organizations Y and Z. Channels D, E, and F in the shard may be associated with organization Z, where channel D is accessible by only organization Z, where channel E is accessible by only organizations Z and X, and where channel F is accessible by only organizations Z and Y.

As such, systems structured in accordance with various embodiments of the disclosure provide specific, technical solutions to technical problems faced by existing systems, the details of which are described hereinafter.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g. user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access (e.g., based on shared communication channel attributes, viewing privilege settings, or both) to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. A communication channel identification may be assigned to a communication channel, which indicates the physical address in a database where related data of that communication channel is stored. A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format and attributes of the group-based communication channel may appear differently to different members of the group-based communication channel; however, the content of the group-based communication channel (i.e., messaging communications) may be displayed to each member of the group-based communication channel. For instance, to allow for public viewing as discussed herein, a common set of group-based messaging communications will be displayed to each member of the respective group-based communication channel such that the content of the group-based communication channel (i.e., messaging communications) will not vary per member of the group-based communication channel. In some instances, to allow for one-sided viewing as discussed herein, a separate set of group-based messaging communications will be displayed to each member of one organization in a group-based communication channel but will not be displayed to any member of any other organization in the group-based communication channel.

As used herein, the terms "messaging communication" and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "general message" refers to a message configured to be amplified by message amplification circuitry over a shared communication channel for one-sided viewing or public viewing. For example, a general message associated with a private viewing privilege setting for a first group identification may be amplified by message amplifier circuitry to all client devices in a shared communication channel that are associated with the first group identification, wherein the general message is not transmitted by the message amplifier circuitry to any client device in the shared communication channel that is associated with a second group identification different from the first group identification. In another example, a general message associated with a public viewing privilege setting may be amplified by message amplifier circuitry to all client devices in a shared communication channel.

The term "storage message" refers to a message stored in a database shard. For example, a storage message may include data such as a message identifier, a group identifier, a group-based communication channel identifier, a sending user identifier, topics, responses, message contents, attachments, message hierarchy data, third party metadata, conversation primitive data, privilege viewing settings, any other suitable data, or any combination thereof. In some embodiments, the storage message may be stored in a database shard in association with a set of viewing privilege settings.

The term "separate index" refers to an index of private messages that are indexed separately and accessible only to client devices associated with a particular group identification (e.g., in a separate index associated with the group and/or company that is not shared with other groups and/or companies).

The term "shared index" refers to an index of public messages that are indexed jointly (e.g., in a shared index associated with the group and/or company that is shared with other groups and/or companies).

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "query" refers to a request associated with a database. A "query" may be generated on one or more client devices, and may be transmitted to a group-based communication platform. A query may be a "select query," which is used to extract data from the database in a readable format according to the query. A query may be an "action query," which asks for operations (such as insertion, deletion, and/or updating) on the data stored in a network database. For example, a "communication channel generation query" is an action query that requests the generation of a communication channel.

The term "shard" refers to a collection of related, discrete items of data that may be accessed and managed individually. A shard may be stored in a single database, or optionally spread across multiple databases. This is particularly beneficial when there is a large amount of data. The cost of creating and maintaining a very large database in one place may increase exponentially because, in some instances, that database may require or be implemented using more high-end computers. In contrast, database shards can be distributed across a number of much less expensive commodity databases. "Sharding" refers to partitioning a large database to make it more manageable. Because sharding a database involves breaking up the database into smaller databases that share nothing in common, it causes technical difficulties to create a communication channel that involves two or more database shards. Database may be "sharded" based on a variety of factors, including, but not limited to, channel identifications, user identifications, team identifications, or any attribute of data within database structure. To determine which factor(s) to use, the system may consider data isolation, proximity of data (for the purposes of lookup), and performance/speed of access across a distributed system. The system may need to take into account both the volume of data and the speed with which the system is, in some instances, required or designed to retrieve such data.

The term "referential table" refers to a set of referential connections between and among various data items. A referential table may be in a tabular form, which may include "rows" and "columns." Each row may represent a referential connection, and each column may represent a data item. A data item may be a group identification, a channel identification, a physical address in a network database, a viewing privilege setting, and the like. A referential connection may indicate the relationships and/or constraints between and among various data items. For example, a shard referential table may identify a physical address of a communication channel shard in a network database based on an identification of that communication channel. The shard referential table may include parameters, such as database shard parameter, message server shard parameter, redis shard parameter, solr shard parameter, team metadata (e.g., date create, date archive, date delete), admin user data, domain, email domain, preferences, invites, credits, payment tier, and data indicating whether the team is an enterprise.

The term "event" refers to identifiable, non-transitory occurrence that has technical significance for system hardware and/or software. An event may represent some message, token, count, pattern, value, or marker that can be recognized by a computer system. An application may be triggered to perform certain functions based on the event. For example, in a group-based communication channel, a message sent by a user is an event for applications that utilize the event application programming interface (API). An event may be user-generated, such as keystrokes or mouse movements, or system-generated, such as program loading and errors.

The term "shared communication channel attributes" refers to one or more attributes of a shared communication channel. For example, the set of shared communication channel attributes may comprise one or more shared communication channel names, icons (e.g., pound signs, lock signs), controls (e.g., access controls), settings (e.g., privilege viewing settings), any other suitable attribute, and any combination thereof. In some embodiments, a shared communication channel shard may be assigned a first set of shared communication channel attributes associated with a first group identification (e.g., an initiator group identification), and a second set of shared communication channel attributes associated with a second group identification (e.g., a target group identification), wherein the first set of shared communication channel attributes and the second set of shared communication channel attributes are different. For example, the first set of shared communication channel attributes associated with the first group identification may comprise a first shared communication channel name, and the second set of shared communication channel attributes associated with the second group identification may comprise a second shared communication channel name different from the first shared communication channel name.

The term "viewing privilege setting" refers the viewing privilege settings of some content (e.g., which client devices may view the content). For example, the viewing privilege setting may be a private viewing privilege setting (e.g., specific to one or more group identifications and hidden from public view), a public viewing privilege setting, any other suitable viewing privilege setting, or a combination thereof (e.g., the contents of a message may be associated with a public viewing privilege setting, while the attachments to the message may be associated with a private viewing privilege setting). In some embodiments, a message may be associated with a set of viewing privilege settings. For example, the message may be a private message associated with a private viewing privilege setting, wherein the private message may be amplified (e.g., transmitted in real-time) to, transmitted to, searchable by, filterable by, viewable to, or accessible to only client devices that are associated with a particular group identification (e.g., a group identification associated with a client device that sent the message) in a shared communication channel. In another example, the message may be a public message associated with a public viewing privilege setting, wherein the public message may be amplified to, transmitted to, searchable by, filterable by, viewable to, or accessible to all client devices in a shared communication channel.

The term "one-sided viewing" and similar terms refer to data, information, messages, content, and attachments associated with a private viewing privilege setting that may be amplified (e.g., transmitted in real-time) to, transmitted to, searchable by, filterable by, viewable to, or accessible to only client devices that are associated with a particular group identification (or, in some instances, two or more group identifications) in a shared communication channel.

The term "set" refers to a collection of zero or more elements.

Example System Architecture

Methods, apparatuses, and computer program products of the present disclosure may be embodied by any of a variety of devices. For example, the method, apparatus, and computer program product of an example embodiment may be embodied by a network device, such as a server or other network entity, configured to communicate with one or more devices, such as one or more client devices. In some embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present disclosure may operate. Users may access a group-based communication platform 105 via a communications network 103 using client devices 101A-101N.

Communications network 103 may include any wired or wireless communications network including, for example, a wired or wireless local area network (LAN), personal area network (PAN), metropolitan area network (MAN), wide area network (WAN), or the like, as well as any hardware, software and/or firmware (such as, e.g., network routers, etc.). For example, communications network 103 may include a cellular telephone, an 802.11, 802.16, 802.20, and/or WiMax network. Further, the communications network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication platform 105 may include a message server 107 and a network application server 109. The network application server 109 may communicate with a main database 111 and one or more database shards 113A-113N.

The message server 107 may be embodied as a computer or computers as one or more circuitries, computers, or computing systems as described herein. The message server 107 may provide for receiving electronic data from various sources, including, but not limited to, the client devices 101A-101N via the communications network 103. For example, the message server 107 may be operable to receive and process electronic messages provided by the client devices 101A-101N. The message server 107 may also facilitate transmission and amplification of electronic messages to the client devices 101A-101N.

Similarly, the network application server 109 may be embodied as one or more circuitries, computers, or computing systems as described herein. The network application server 109 may provide for receiving electronic data from various sources, including, but not limited to, the client devices 101A-101N via the communications network 103. For example, the network application server 109 may be operable to receive and process electronic messages provided by the client devices 101A-101N. The network application server 109 may also be operable to receive and process network database queries provided by the client devices 101A-101N and/or the message server 107 regarding the main database 111 and/or one or more database shards 113A-113N. The network application server 109 may further facilitate the generation of user interfaces.

The client devices 101A-101N may be any computing device as defined above. Electronic data received by the message server 107 and the network application server 109 from the client devices 101A-101N may be provided in various forms and via various methods.

In some embodiments, one or more of the client devices 101A-101N are mobile devices, such as smartphones or tablets. The one or more client devices may execute an "app" to interact with the message server 107 and/or network application server 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system.

In some embodiments, the client devices 101A-101N may interact with the message server 107 and/or network application server 109 via a web browser. The client devices 101A-101N may also include various hardware or firmware designed to interact with the message server 107 and/or network application server 109.

In some embodiments, the database shards 113A-113N may be embodied as a data storage device such as a network attached storage (NAS) device or devices, or as a separate database server or servers. The database shards 113A-113N include information accessed and stored by the network application server 109. For example, the database shards 113A-113N may include, without limitation, user profiles, user privilege information, electronic files, messaging communications organized among a plurality of group-based communication channels, and/or the like.

In some embodiments, the main database 111 may be embodied as a data storage device such as a network attached storage (NAS) device or devices, or as a separate database server or servers. The main database 111 includes information accessed and stored by the network application server 109. For example, the main database 111 may include, without limitation, a shard referential table.

In some embodiments of an example group-based communication platform 105, a message or messaging communication may be sent from a client device 101A-101N to a group-based communication platform 105. In various implementations, messages may be sent to the group-based communication platform 105 over communications network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, shared communication channel attributes (e.g., a first set of shared communication channel attributes associated with a first group identification, and a second set of shared communication channel attributes associated with a second group identification), message contents (e.g., text, emojis, images, links), attachments (e.g., files), message hierarchy data (e.g., the message may be a reply to another message), third party metadata, and/or the like. In one embodiment, the client device 101A-101N may provide the following example private message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
```

```
<user_accounts_details>
    <user_account_credentials>
        <user_name>ID_user_1</user_name>
        <password>abc123</password>
        //OPTIONAL <cookie>cookieID</cookie>
        //OPTIONAL <digital_cert_link>www.mydigitalcertificate.com/
JohnDoeDaDoeDoe@gmail.com/mycertifcate.dc</digital_cert_link>
        //OPTIONAL <digital_certificate>_DATA_</digital_certificate>
    </user_account_credentials>
</user_accounts_details>
<client_details> //iOS Client with App and Webkit
    //it should be noted that although several client details
    //sections are provided to show example variants of client
    //sources, further messages will include only on to save
    //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>MSM.app</app_name>
    <app_version>1.0 </app_version>
    <app_webkit_name>Mobile Safari</client_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
```

```
policy.</contents>
        <attachments>patent_policy.pdf</attachments>
        <viewing_privilege_settings>private</viewing_privilege_settings>
    </message>
</auth_request>
```

The group-based communication platform 105 comprises at least one message server 107 that may create a storage message based upon the received message to facilitate message indexing and storage in one or more database shards 113A-113N. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example private storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy
    our patent policy.</contents>
    <attachments>patent_policy.pdf</attachments>
        <viewing_privilege_settings>private
        </viewing_privilege_settings>
    <conversation_primitive>
        conversation includes messages: ID_message_8, ID_message_9,
        ID_message_10, ID_message_11, ID_message_12
    </conversation_primitive>
</storage_message>
```

In some embodiments, a group identifier as defined above may be associated with the message. In some embodiments, a group-based communication channel identifier as defined above may be associated with the message.

In some embodiments, a sending user identifier as defined above may be associated with the message. In one implementation, the message may be parsed (e.g., using PHP commands) to determine a sending user identifier of the user who sent the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from the message server 107). In one implementation, a storage message may be sent from group-based communication server 106 to facilitate indexing in the message server 107. In another implementation, metadata associated with the message may be determined and the message may be indexed in the message server 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in the message server 107 to facilitate searching. In one embodiment, the files may be indexed such that a company's or a group's files are indexed at a separate distributed repository.

An example of electronic information exchange among one or more client devices 101A-101N and the group-based communication platform 105 is described below.

The one or more client devices 101A-101N are configured to generate one or more shared communication channel generation queries associated with the database shards 113A-113N. Continuing from the "Tony to Frank" discussion, Tony may use client device 101A (having a group identification associated with organization X) to generate a shared communication channel generation query, requesting the creation of an externally shared communication channel with Frank's client device 101B (having a group identification associated with organization Y). Organization X and organization Y are each associated with a separate shard of database shards 113A-113N. The shared communication channel generation query may be transmitted to the group-based communication platform 105 via the communications network 103.

Upon receiving the one or more shared communication channel generation queries from the one or more client devices 101A-101N, the group-based communication platform 105 may utilize the network application server 109 to generate one or more database shards based on the one or more shared communication channel generation queries. The network application server 109 may further assign a shared communication channel identification to each of the one or more generated database shards. Continuing from the previous example, the network application server 109 may generate a database shard 113N based on the shared communication channel generation query provided by Tony via the client device 101A, and may associate a shared communication channel identification with the database shard 113N.

After generating one or more database shards based on one or more shared communication channel generation queries, the group-based communication platform 105 may transmit one or more shared communication channel acceptance requests to one or more client devices 101A-101N. Continuing from the previous example, the group-based communication platform 105 may transmit a shared communication channel acceptance request to client device 101B (Frank), which is indicated in the shared communication channel generation query provided by client device 101A (Tony).

Upon receiving the shared communication channel acceptance request, the one or more client devices 101A-101N may generate one or more electronic approvals, and may transmit these electronic approvals to the group-based communication platform 105. Continuing from the previous example, Frank, via client device 101B, may generate an electronic approval in response to the shared communication channel acceptance request. The electronic approval may indicate Frank's acceptance of the shared communication channel generation query provided by Tony. The client device 101B may further transmit the electronic approval to the group-based communication platform 105.

Upon receiving the one or more electronic approvals from one or more client devices 101A-101N, the group-based communication platform 105 associates the one or more channel identifications with the one or more client devices 101A-101N through a shard referential table stored in the main database 111. Continuing from the previous example, upon receiving an electronic approval from client device 101B, the group-based communication platform 105 may further update the shard referential table stored in the main database 111 based on the organization X identification, organization Y identification, and the shared communication channel identification of the newly created database shard, such as database shard 113N.

By generating a shared communication channel shard and updating the shard referential table, the present disclosure provides many technical advantages over existing systems, such as solving the union of identities issue. Continuing from the "Tony-X/Tony-Z" example above, an externally shared communication channel between organization X and organization Z, created based on the present disclosure, is able to reconcile Tony's two identities, Tony-X and Tony-Z, in two separated organization. While updating the shard referential table, systems structured in accordance with embodiments of present disclosure are able to identify duplicate user identities by, for example, searching and comparing data associated with each organization. Upon determining that Tony-X and Tony-Y are associated with the same individual, systems structured in accordance with embodiments of present disclosure assign a unified identity to Tony in the shared communication channel shard. Existing systems, on the other hand, are unable to solve the union of identities issue, as they fail to create a shared communication channel shard and/or update a shard referential table.

The group-based communication platform 105 may further generate one or more interfaces for the one or more generated database shards, and may transmit the one or more interfaces to the client devices 101A-101N. Continuing from the previous example, the group-based communication platform 105 may generate a user interface for the database shard 113N, and transmit the user interface to client devices 101A and 101B. In some embodiments, the group-based communication platform 105 may (e.g., based on shared communication channel attributes, viewing privilege settings, or both): send only the appropriate data/interface to client devices 101A and 101B; retrieve and cache the data before sending it to client devices 101A and 101B; compile an interface program that can be used as part of apps on client devices 101A and 101B; or perform any other suitable operation or combination of operations described herein.

In some embodiments, the referential table stored in the main database 111 may indicate referential connections between a group identification and a database shard of database shards 113A-113N. Continuing form the previous example, client devices 101A and 101C may be both associated with organization X identification, and the shard referential table may indicate that data related to communications between client devices 101A-101B are stored in database shard 113A.

In some embodiments, when the group-based communication platform 105 receives one or more electronic approvals from one or more client devices 101A-101N, the group-based communication platform 105 may update the shard referential table stored in the main database 111 by generating a new referential connection. For example, after receiving an electronic approval to create a shared communication channel between organization X and organization Y, the group-based communication platform 105 may update the shard referential table, indicating the referential connection between organization X identification, organization Y identification, and the identification of the newly generated database shard.

In some embodiments, the group-based communication platform 105 may amplify electronic messages received from one or more client devices 101A-101N in an externally shared communication channel to other client devices in the same channel using the message server 107. For example, the message server 107 may receive an electronic message from client device 101A in association with an externally shared communication channel. The message server 107 may query the network application server 109, which in turn identifies one or more client devices associated with the externally shared communication channel based on the shard referential table stored in the main database 111. The message server 107 may further transmit the electronic message to each identified client device.

As a foundation for some embodiments, the example computing system 100 may provide for creating a shared communication channel in a group-based communication platform 105. The group-based communication platform 105 may comprise a message server 107 (e.g., a real-time message server), a network application server 109, a plurality of database shards 113A-113N, and a main database 111. The example computing system 100 may provide for receiving, by the group-based communication platform 105 over the communications network 103 from a first client device 101A associated with an initiator group identification, a shared communication channel generation query associated with the initiator group identification and a target group identification. The example computing system 100 may further provide for generating, by the network application server 109, a shared communication channel shard (e.g., database shard 113N). The plurality of database shards 113A-113N may comprise the shared communication channel shard. The shared communication channel shard may be assigned (e.g., by the group-based communication platform 105, the network application server 109, or both) a shared communication channel identification, a first set of shared communication channel attributes associated with the initiator group identification, and a second set of shared communication channel attributes associated with the target group identification. The example computing system 100 may further provide for generating, by the network application server 109, a shared communication channel acceptance request. The shared communication channel acceptance request may be associated with the shared communication channel identification. The example computing system 100 may further provide for transmitting, by the group-based communication platform 105 over the communications network 103 to a second client device 101B associated with the target group identification, the shared communication channel acceptance request. The example computing system 100 may further provide for receiving, by the group-based communication platform 105 over the communications network 103 from one of the client devices 101A-101N, a shared communication channel acceptance notification. The shared communication channel acceptance notification may comprise an electronic approval to associate the shared communication channel identification with the target group identification. The example computing system 100 may further provide for updating, by the network application server 109, a shard referential table stored in the main database 111 based on the initiator group identification, the target group identification, the shared communication channel identification, the first set of shared communication channel attributes, and the second set of shared communication channel attributes. The example computing system 100 may further provide for generating, by the network application server 109, a first externally shared group-based shared communication channel interface of the shared communication channel based on the shared communication channel shard and the first set of shared communication channel attributes associated with the initiator group identification. The example computing system 100 may further provide for generating, by the network application server 109, a second externally shared group-based shared communication channel interface of the shared communication channel based on the shared communication channel shard and the second set of shared communication channel attributes associated with the target group identification. The example computing system 100 may further provide for transmitting, by the group-based communication platform 105 over the communications network 103 to the first client device 101A, the first externally shared group-based shared communication channel interface of the shared communication channel. The example computing system 100 may further provide for transmitting, by the group-based communication platform 105 over the communications network 103 to the second client device 101B, the second externally shared group-based shared communication channel interface of the shared communication channel.

In some embodiments, the plurality of database shards 113A-113N may comprise a first database shard 113A associated with the initiator group identification. The plurality of database shards may further comprise a second database shard 113B associated with the target group identification. The shard referential table stored in the main database 111 may comprise a first referential connection between the initiator group identification and the first database shard 113A. The shard referential table may further comprise a second referential connection between the target group identification and the second database shard 113B. The example computing system 100 may further provide for identifying, by the network application server 109 based on the initiator group identification, the first referential connection in the shard referential table. The example computing system 100 may further provide for identifying, by the network application server 109 based on the target group identification, the second referential connection in the shard referential table. The example computing system 100 may further provide for generating, by the network application server 109, a third referential connection between the shared communication channel identification, the shared communication channel shard (e.g., database shard 113N), the first referential connection, and the second referential connection. The example computing system 100 may further provide for updating, by the network application server 109, the shard referential table stored in the main database 111 to comprise the third referential connection.

In some embodiments, the example computing system 100 may further provide for generating general messages, storage messages, or both based on messages received from client devices 101A-101N. In one illustrative example, the client device 101A and the client device 101B may be associated with a first group identification and a shared communication channel identification, while a client device 101C (not shown) and a client device 101D (not shown) may be associated with a second group identification and the shared communication channel identification. The group-based communication platform 105 may receive, in real-time over the shared communication channel from the client device 101A, a first message (e.g., a private message) associated with a first set of viewing privilege settings comprising a first private viewing privilege setting. The group-based communication platform 105 may generate, in real-time by the message server 107, a first general message (e.g., a private general message) based on the received first message and the first set of viewing privilege settings comprising the first private viewing privilege setting. The group-based communication platform 105 may transmit, in real-time by the message server 107, the first general message to other client devices associated with the first group identification (e.g., the first general message is transmitted to the client device 101B), wherein the first general message is not transmitted to any client device associated with the second group identification (e.g., the first general message is not transmitted to the client device 101C or the client device 101D). In some instances, the first general message is viewable in the first externally shared group-based shared communication channel interface to any client device associated with the first group identification (e.g., the first general message is viewable in the first externally shared group-based shared communication channel interface to the client device 101A and the client device 101B), wherein the first general message is not viewable in the second externally shared group-based shared communication channel interface to any client device associated with the second group identification (e.g., the first general message is not viewable in the second externally shared group-based shared communication channel interface to the client device 101C or the client device 101D).

In some embodiments, the group-based communication platform 105 may generate, by the network application server 109, a first storage message (e.g., a private storage message) based on the received first message and the first set of viewing privilege settings comprising the first private viewing privilege setting. The group-based communication platform 105 may store, by the network application server 109 in the first database shard 113A, the first storage message in association with the first set of viewing privilege settings. The group-based communication platform 105 may index, by the network application server 109, the first storage message in a first separate index associated with the first group identification, wherein the first separate index is accessible to any client device associated with the first group identification (e.g., the first separate index is accessible to the client device 101A and the client device 101B), and wherein the first separate index is not accessible to any client device associated with the second group identification (e.g., the first separate index is not accessible to the client device 101C or the client device 101D). In some instances, the first storage message is searchable in the first externally shared group-based shared communication channel interface by any client device associated with the first group identification (e.g., the first storage message is searchable in the first externally shared group-based shared communication channel interface by the client device 101A and the client device 101B), wherein the first storage message is not searchable in the second externally shared group-based shared communication channel interface by any client device associated with the second group identification (e.g., the first storage message is not searchable in the second externally shared group-based shared communication channel interface by the client device 101C or the client device 101D).

In another illustrative example continuing from the previous illustrative example, the group-based communication platform 105 may receive, in real-time over the shared communication channel from the client device 101B, a second message (e.g., a public message) associated with a second set of viewing privilege settings comprising a first public viewing privilege setting. The group-based communication platform 105 may generate, in real-time by the message server 107, a second general message (e.g., a public general message) based on the received second message and the second set of viewing privilege settings comprising the first public viewing privilege setting. The group-based communication platform 105 may transmit, in real-time by the message server 107, the second general message to other client devices associated with the shared communication channel identification (e.g., the first general message is transmitted to the client device 101B, the client device 101C, and the client device 101D). In some instances, the second general message is viewable to any client device associated with the shared communication channel identification (e.g., the second general message is viewable to the client device 101A, the client device 101B, the client device 101C, and the client device 101D). For example, the second general message is viewable in the first externally shared group-based shared communication channel interface to any client device associated with the first group identification (e.g., the second general message is viewable in the first externally shared group-based shared communication channel interface to the client device 101A and the client device 101B), and the second general message is viewable in the second externally shared group-based shared communication channel interface to any client device associated with the second group identification (e.g., the second general message is not viewable in the second externally shared group-based shared communication channel interface to the client device 101C or the client device 101D).

The group-based communication platform 105 may generate, by the network application server 109, a second storage message (e.g., a public storage message) based on the received second message and the second set of viewing privilege settings comprising the first public viewing privilege setting. The group-based communication platform 105 may store, by the network application server 109 in the first database shard 113A, the first storage message in association with the first set of viewing privilege settings. The group-based communication platform 105 may index, by the network application server 109, the second storage message in a shared index associated with the first group identification and the second group identification, wherein the shared index is accessible to any client device associated with the first group identification or the second group identification (e.g., the shared index is accessible to the client device 101A, the client device 101B, the client device 101C, and the client device 101D). In some instances, the second storage message is searchable by any client device associated with the first group identification or the second group identification (e.g., the second storage message is searchable by the client device 101A, the client device 101B, the client device 101C, and the client device 101D). For example, the second storage message is searchable in the first externally shared group-based shared communication channel interface by any client device associated with the first group identification (e.g., the second storage message is searchable in the first externally shared group-based shared communication channel interface by the client device 101A and the client device 101B), and the second storage message is searchable in the second externally shared group-based shared communication channel interface by any client device associated with the second group identification (e.g., the second storage message is not searchable in the second externally shared group-based shared communication channel interface by the client device 101C or the client device 101D).

In yet another illustrative example continuing from the previous illustrative examples, the group-based communication platform 105 may receive, in real-time over the shared communication channel from the client device 101C, a third message (e.g., a private message) associated with a third set of viewing privilege settings comprising a second private viewing privilege setting. The group-based communication platform 105 may generate, in real-time by the message server 107, a third general message (e.g., a private general message) based on the received third message and the third set of viewing privilege settings comprising the second private viewing privilege setting. The group-based communication platform 105 may transmit, in real-time by the message server 107, the third general message to other client devices associated with the second group identification (e.g., the third general message is transmitted to the client device 101D), wherein the third general message is not transmitted to any client device associated with the first group identification (e.g., the third general message is not transmitted to the client device 101A or the client device 101B). In some instances, the third general message is viewable in the second externally shared group-based shared communication channel interface to any client device associated with the second group identification (e.g., the third general message is viewable in the second externally shared group-based shared communication channel interface to the client device 101C and the client device 101D), wherein the third general message is not viewable in the first externally shared group-based shared communication channel interface to any client device associated with the first group identification (e.g., the third general message is not viewable in the first externally shared group-based shared communication channel interface to the client device 101A or the client device 101B).

The group-based communication platform 105 may generate, by the network application server 109, a third storage message (e.g., a private storage message) based on the received third message and the third set of viewing privilege settings comprising the second private viewing privilege setting. The group-based communication platform 105 may store, by the network application server 109 in the second database shard 113B, the third storage message in association with the third set of viewing privilege settings. The group-based communication platform 105 may index, by the network application server 109, the third storage message in a second separate index associated with the second group identification, wherein the second separate index is accessible to any client device associated with the second group identification (e.g., the second separate index is accessible to the client device 101C and the client device 101D), and wherein the second separate index is not accessible to any client device associated with the first group identification (e.g., the second separate index is not accessible to the client device 101A or the client device 101B). In some instances, the third storage message is searchable in the second externally shared group-based shared communication channel interface by any client device associated with the second group identification (e.g., the third storage message is searchable in the second externally shared group-based shared communication channel interface by the client device 101C and the client device 101D), wherein the third storage message is not searchable in the first externally shared group-based shared communication channel interface by any client device associated with the first group identification (e.g., the third storage message is not searchable in the first externally shared group-based shared communication channel interface by the client device 101A or the client device 101B).

In yet another illustrative example continuing from the previous illustrative examples, the group-based communication platform 105 may receive, in real-time over the shared communication channel from the client device 101D, a fourth message (e.g., a public message) associated with a fourth set of viewing privilege settings comprising a second public viewing privilege setting. The group-based communication platform 105 may generate, in real-time by the message server 107, a fourth general message (e.g., a public general message) based on the received fourth message and the fourth set of viewing privilege settings comprising the second public viewing privilege setting. The group-based communication platform 105 may transmit, in real-time by the message server 107, the fourth general message to other client device associated with the shared communication channel identification (e.g., the fourth general message is transmitted to the client device 101A, the client device 101B, and the client device 101C). In some instances, the fourth general message is viewable to any client device associated with the shared communication channel identification (e.g., the fourth general message is viewable to the client device 101A, the client device 101B, the client device 101C, and the client device 101D). For example, the fourth general message is viewable in the first externally shared group-based shared communication channel interface to any client device associated with the first group identification (e.g., the fourth general message is viewable in the first externally shared group-based shared communication channel interface to the client device 101A and the client device 101B), and the fourth general message is viewable in the second externally shared group-based shared communication channel interface to any client device associated with the second group identification (e.g., the fourth general message is not viewable in the second externally shared group-based shared communication channel interface to the client device 101C or the client device 101D).

The group-based communication platform 105 may generate, by the network application server 109, a fourth storage message (e.g., a public storage message) based on the received fourth message and the fourth set of viewing privilege settings comprising the second public viewing privilege setting. The group-based communication platform 105 may store, by the network application server 109 in the second database shard 113B, the fourth storage message in association with the fourth set of viewing privilege settings. The group-based communication platform 105 may index, by the network application server 109, the fourth storage message in the shared index associated with the first group identification and the second group identification, wherein the shared index is accessible to any client device associated with the first group identification or the second group identification (e.g., the shared index is accessible to the client device 101A, the client device 101B, the client device 101C, and the client device 101D). In some instances, the fourth storage message is searchable by any client device associated with the first group identification or the second group identification (e.g., the fourth storage message is searchable by the client device 101A, the client device 101B, the client device 101C, and the client device 101D). For example, the fourth storage message is searchable in the first externally shared group-based shared communication channel interface by any client device associated with the first group identification (e.g., the fourth storage message is searchable in the first externally shared group-based shared communication channel interface by the client device 101A and the client device 101B), and the fourth storage message is searchable in the second externally shared group-based shared communication channel interface by any client device associated with the second group identification (e.g., the fourth storage message is not searchable in the second externally shared group-based shared communication channel interface by the client device 101C or the client device 101D).

The above-referenced electronic information exchange provides various technical advantages over existing systems. For example, it allows information retrieval and dispatch of data without the over-burdening of messages dispatched to the communications network 103. In addition, the robustness of data, along with the dispatch speed based on the configuration of the communications network 103, provides the group-based communication platform 105 the option to utilize either the message server 107 or the network application server 109. Further, it provides an option for external applications (developed for the group-based communication platform 105) to use websocket or RPC APIs (which may further use the message server 107 or the network application server 109) to emit messages, as further discussed below.

Example Apparatus for Implementing Embodiments of the Present Disclosure

The message server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described above with respect to FIG. 1 and below with respect to FIGS. 4-7. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some embodiments, the processor 202 may be configured to execute instructions stored in the memory 204 or otherwise accessible to the processor 202. In some embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise an externally shared group-based shared communication channel interface (e.g., a first externally shared group-based shared communication channel interface, a second externally shared group-based shared communication channel interface) of a shared communication channel, a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communications network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify (e.g., transmit to one or more circuitries or devices; broadcast; multicast; unicast) electronic messages and associated metadata received from one or more client devices to other client devices based on the database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The network application server 109 may be embodied by one or more computing systems, such as apparatus 300 shown in FIG. 3. The apparatus 300 may include processor 301, memory 303, input/output circuitry 305, communications circuitry 307, database circuitry 309, interface generation circuitry 311, and referential table generation circuitry 313. The apparatus 300 may be configured to execute the operations described above with respect to FIG. 1 and below with respect to FIGS. 4-7. Although these components 301-313 are described with respect to functional limitations, it should be understood that the particular implementations necessarily include the use of particular hardware. It should also be understood that certain of these components 301-313 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or coprocessor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present disclosure.

The processor 301 may be embodied in a number of different ways and may, for example, include one or more processing devices configured to perform independently. In some embodiments, the processor 301 may include one or more processors configured in tandem via a bus to enable independent execution of instructions, pipelining, and/or multithreading.

In some embodiments, the processor 301 may be configured to execute instructions stored in the memory 303 or otherwise accessible to the processor 301. In some embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise an externally shared group-based shared communication channel interface (e.g., a first externally shared group-based shared communication channel interface, a second externally shared group-based shared communication channel interface) of a shared communication channel, a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communications network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

In some embodiments, the communications circuitry 307, the communications circuitry 208, or both may be configured to receive, from a first client device associated with an initiator group identification, a shared communication channel generation query associated with the initiator group identification and a target group identification. The communications circuitry 307, the communications circuitry 208, or both may be further configured to transmit, to a second client device associated with the target group identification, a shared communication channel acceptance request. The communications circuitry 307, the communications circuitry 208, or both may be further configured to receive a shared communication channel acceptance notification. The communications circuitry 307, the communications circuitry 208, or both may be further configured to transmit, to the first client device, a first externally shared group-based shared communication channel interface of the shared communication channel. The communications circuitry 307, the communications circuitry 208, or both may be further configured to transmit, to the second client device, a second externally shared group-based shared communication channel interface of the shared communication channel. The communications circuitry 307, the communications circuitry 208, or both may be further configured to receive, over the shared communication channel from a third client device associated with the initiator group identification, a message associated with a set of viewing privilege settings. The communications circuitry 307, the communications circuitry 208, or both may be further configured to receive, over the shared communication channel from a fourth client device associated with the target group identification, a second message associated with a second set of viewing privilege settings. The communications circuitry 307, the communications circuitry 208, or both may be further configured to receive, over the shared communication channel from a third client device associated with the initiator group identification, a message associated with a set of viewing privilege settings.

Database circuitry 309 includes hardware configured to manage one or more network databases, including database shards 113A-113N and the main database 111. The database circuitry 309 may utilize processing circuitry, such as the processor 301, to perform these actions. The database circuitry 309 may transmit data to the interface generation circuitry 311 and referential table generation circuitry 313. In some embodiments, the data sent may be associated with the one or more database shards 113A-113N.

In some embodiments, the database circuitry 309 may include a separate processor, specially configured Field Programmable Gate Array (FPGA), or Application Specific Integrated Circuit (ASIC). In some implementations, the referential table generation circuitry 313 and the interface generation circuitry 311, described below, may be sub-circuitries belonging to database circuitry 309. The database circuitry 309 may be implemented using hardware components of the apparatus configured by either hardware or software for implementing the functions described herein.

In some embodiments, the database circuitry 309 may be configured to receive, from the communications circuitry 307, the shared communication channel generation query. The database circuitry 309 may be further configured to generate a shared communication channel shard. The plurality of database shards may comprise the shared communication channel shard. The shared communication channel shard may be assigned a shared communication channel identification, a first set of shared communication channel attributes associated with the initiator group identification, and a second set of shared communication channel attributes associated with the target group identification. The database circuitry 309 may be further configured to generate the shared communication channel acceptance request. The shared communication channel acceptance request may be associated with the shared communication channel identification. The database circuitry 309 may be further configured to transmit, to the communications circuitry 307 for transmission to the second client device associated with the target group identification, the shared communication channel acceptance request. The database circuitry 309 may be further configured to receive, from the communications circuitry 307, the shared communication channel acceptance notification. The shared communication channel acceptance notification may comprise an electronic approval to associate the shared communication channel identification with the target group identification.

In some embodiments, the database circuitry 309 may be further configured to receive, from the communications circuitry 307, the message associated with the set of viewing privilege settings. The database circuitry 309 may be further configured to generate a storage message based on the received message and the set of viewing privilege settings. The database circuitry 309 may be further configured to store, in the first database shard, the storage message in association with the set of viewing privilege settings. In embodiments where the set of viewing privilege settings comprises a private viewing privilege setting, the database circuitry 309 may be further configured to index the storage message in a separate index associated with the initiator group identification, wherein the separate index is not accessible to any client device associated with the initiator group identification, and wherein the separate index is not accessible to any client device associated with the target group identification. In embodiments where the set of viewing privilege settings comprises a public viewing privilege setting, the database circuitry 309 may be further configured to index the storage message in a shared index associated with the initiator group identification and the target group identification, wherein the shared index is accessible to the first client device and the second client device.

The referential table generation circuitry 313 includes hardware configured to generate and update shard referential table store in the main database 111. The referential table generation circuitry 313 may utilize processing circuitry, such as the processor 301, to perform these actions. However, it should also be appreciated that, in some embodiments, the referential table generation circuitry 313 may include a separate processor, specially configured Field Programmable Gate Array (FPGA), or Application Specific Integrated Circuit (ASIC) for performing the functions described herein. The referential table generation circuitry 313 may be implemented using hardware components of the apparatus configured by either hardware or software for implementing these planned functions.

In some embodiments, the referential table generation circuitry 313 may be configured to update the shard referential table based on the initiator group identification, the target group identification, the shared communication channel identification, the first set of shared communication channel attributes, and the second set of shared communication channel attributes. The referential table generation circuitry 313 may be further configured to identify, based on the initiator group identification, the first referential connection in the shard referential table. The referential table generation circuitry 313 may be further configured to identify, based on the target group identification, the second referential connection in the shard referential table. The referential table generation circuitry 313 may be further configured to generate a third referential connection between the shared communication channel identification, the shared communication channel shard, the first referential connection, and the second referential connection. The referential table generation circuitry 313 may be further configured to update the shard referential table to comprise the third referential connection.

The interface generation circuitry 311 includes hardware configured to generate communication channel interfaces for client devices 101A-101N. The interface generation circuitry 311 may utilize processing circuitry, such as the processor 301, to perform these actions. However, it should also be appreciated that, in some embodiments, the interface generation circuitry 311 may include a separate processor, specially configured Field Programmable Gate Array (FPGA), or Application Specific Integrated Circuit (ASIC) for performing the functions described herein. The interface generation circuitry 311 may be implemented using hardware components of the apparatus configured by either hardware or software for implementing these planned functions.

In some embodiments, the interface generation circuitry 311 may be configured to generate the first externally shared group-based shared communication channel interface of the shared communication channel based on the shared communication channel shard and the first set of shared communication channel attributes associated with the initiator group identification. The interface generation circuitry 311 may be further configured to generate the second externally shared group-based shared communication channel interface of the shared communication channel based on the shared communication channel shard and the second set of shared communication channel attributes associated with the target group identification. The interface generation circuitry 311 may be further configured to transmit, to the communications circuitry 307 for transmission to the first client device, the first externally shared group-based shared communication channel interface of the shared communication channel. The interface generation circuitry 311 may be further configured to transmit, to the communications circuitry 307 for transmission to the second client device, the second externally shared group-based shared communication channel interface of the shared communication channel. In some embodiments, the first and second externally shared group-based shared communication channel interfaces generated and transmitted by the interface generation circuitry 311 may provide for "one-sided viewing" as described herein.

In some embodiments, the communications circuitry 307 of the apparatus 300 may be configured to transmit the first message associated with the first set of viewing privilege settings to the communications circuitry 208 of the apparatus 200. The message amplifier circuitry 210 may be configured to receive, from the communications circuitry 208, the first message associated with the first set of viewing privilege settings. The message amplifier circuitry 210 may be further configured to generate a first general message based on the received first message and the first set of viewing privilege settings. The message amplifier circuitry 210 may be further configured to transmit the first general message over the shared communication channel to a first plurality of client devices based on the first set of viewing privilege settings. In some embodiments where the first set of viewing privilege settings comprises a first private viewing privilege setting, the message amplifier circuitry 210 may be further configured to transmit the first general message over the shared communication channel to a first plurality of client devices associated with the initiator group identification, wherein the first general message is not transmitted by the message amplifier circuitry 210 to any client device associated with the target group identification. In some embodiments where the first set of viewing privilege settings comprises a first public viewing privilege setting, the message amplifier circuitry 210 may be further configured to transmit the first general message over the shared communication channel to one or more client devices associated with the initiator group identification and one or more client devices associated with the target group identification.

In some embodiments, the communications circuitry 307 of the apparatus 300 may be configured to transmit the second message associated with the second set of viewing privilege settings to the communications circuitry 208 of the apparatus 200. The message amplifier circuitry 210 may be further configured to receive, from the communications circuitry, the second message associated with the second set of viewing privilege settings. The message amplifier circuitry 210 may be further configured to generate a second general message based on the received second message and the second set of viewing privilege settings. The message amplifier circuitry 210 may be further configured to transmit, over the shared communication channel to a second plurality of client devices based on the second set of viewing privilege settings, the second general message. In some embodiments where the second set of viewing privilege settings comprises a second private viewing privilege setting, the message amplifier circuitry 210 may be further configured to transmit the second general message over the shared communication channel to a second plurality of client devices associated with the target group identification, wherein the second general message is not transmitted by the message amplifier circuitry 210 to any client device associated with the initiator group identification. In some embodiments where the second set of viewing privilege settings comprises a second public viewing privilege setting, the message amplifier circuitry 210 may be further configured to transmit the second general message over the shared communication channel to one or more client devices associated with the initiator group identification and one or more client devices associated with the target group identification.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows for Generating Externally Shared Communication Channels

FIGS. 4, 5, 6, and 7 illustrate various interactions between one or more client devices 101A-101N and the group-based communication platform 105 in generating an externally shared communication channel based on whether the initiator and the target of the shared communication channel generation query is an administrator of a group.

The term "administrator" refers to a subscriber of a communication channel who has authority to manage the communication channel and make decisions on behalf of other subscribers regarding various maintenance tasks. For example, a group administrator may have the authority to set a communication channel as either "public" or "private." As another example, when receiving a request to create an externally shared communication channel, only a group administrator has the authority to accept the request on behalf of the group. In some embodiments, the system uses a flag on data associated with a user to indicate whether the user is a member of a group.

Referring now to FIG. 4, the process 400 illustrates an example process of generating an externally shared communication channel when a non-administrator of group A submits a request to create a shared communication channel targeting a non-administrator of group B.

The process 400 starts at step 402, where a non-administrator of group A submits a request to create an externally shared communication channel. The system automatically creates an invite for the non-administrator of group A, and shares the invite with the non-administrator of group B at step 404. Here, an invite is an electronic indication of the request to create an externally shared communication channel. For example, an invite can take the form of a Uniform Resource Locator (URL) that links to a webpage containing details of the request. In some embodiments, the URL link may expire after a predetermined amount of time has passed since the URL link has been transmitted. For example, a user may set the URL to expire after 24 hours of transmission.

The non-administrator of group B receives the invite at step 406. At step 408, the non-administrator of group B makes an initial decision as to whether to add a channel. If the non-administrator of group B decides not to add the channel, then the non-administrator of group A receives an electronic indication that the request has been denied at step 410.

If the non-administrator of group B decides to add the channel, then the system automatically forwards the request to create an externally shared communication channel to an administrator of group A and an administrator of group B at steps 412 and 414, respectively. If the administrator of group A does not approve the request at step 416, then the non-administrators of group A and group B receive electronic indications that the request has been denied at step 420. Similarly, if the administrator of group B does not approve the request at step 418, then the non-administrators of group A and group B receive electronic indications that the request has been denied at step 420.

When both the administrator of group A and the administrator of group B approve the request, the system proceeds with the creation of an externally shared communication channel at step 422.

Referring now to FIG. 5, the process 500 illustrates an example process of generating an externally shared communication channel when a non-administrator of group A submits a request to create a shared communication channel targeting an administrator of group B.

The process 500 starts at step 501, where a non-administrator of group A submits a request to create an externally shared communication channel. The system automatically creates an invite for the non-administrator of group A, and shares the invite with the administrator of group B at step 503.

Upon sharing the invite with the administrator of group B, the system automatically generates a request for approval at step 505. The administrator of group B then decides whether to approve the request to create an externally shared communication channel at step 507. If the administrator of group B does not approve the request, then the non-administrator of group A receives an electronic indication that the request has been denied at step 509.

If the administrator of group B approves the request, then the system automatically forwards the request to an administrator of group A at step 511. If the administrator of group A does not approve the request at step 513, then both the administrator and the non-administrator of group B receive electronic indications that the request has been denied at step 515.

If the administrator of group A approves the request at step 513, the system proceeds with the creation of an externally shared communication channel at step 517.

Referring now to FIG. 6, the process 600 illustrates an example process of generating an externally shared communication channel when an administrator of group A submits a request to create a shared communication channel targeting a non-administrator of group B.

The process 600 starts at step 602, where an administrator of group A submits a request to create an externally shared communication channel. The system automatically creates an invite for the administrator of group A, and shares the invite with the non-administrator of group B at step 604.

The non-administrator of group B receives the invite at step 606. At step 608, the non-administrator of group B makes an initial decision as to whether to add a channel. If the non-administrator of group B decides not to add the channel, then the administrator of group A receives an electronic indication that the request has been denied at step 610.

If the non-administrator of group B decides to add the channel, then the system automatically forwards the request to create externally shared communication channel to the administrator of group A and an administrator of group B at steps 612 and 614, respectively. If the administrator of group A does not approve the request at step 616, then the non-administrators of group B receives an electronic indication that the request has been denied at step 620. Similarly, if the administrator of group B does not approve the request at step 618, then the non-administrator of group B receives an electronic indication that the request has been denied at step 620.

When both the administrator of group A and the administrator of group B approve the request, the system proceeds with the creation of an externally shared communication channel at step 622.

Referring now to FIG. 7, the process 700 illustrates an example process of generating an externally shared communication channel when an administrator of group A submits a request to create a shared communication channel targeting an administrator of group B.

The process 700 starts at step 701, where an administrator of group A submits a request to create an externally shared communication channel. The system automatically creates an invite for the administrator of group A, and shares the invite with an administrator of group B at step 703.

Upon sharing the invite with the administrator of group B, the system automatically generates a request for approval at step 705. The administrator of group B then decides whether to approve the request to create an externally shared communication channel at step 707. If the administrator of group B does not approve the request, then the administrator of group A receives an electronic indication that the request has been denied at step 709.

If the administrator of group B approves the request, then the system automatically forwards the request to the administrator of group A at step 711. If the administrator of group A does not approve the request at step 713, then the administrator of group B receives an electronic indication that the request has been denied at step 715. If the administrator of group A approves the request, the system proceeds with the creation of an externally shared communication channel at step 717.

Example Implementation for Externally Shared Communication Channels

FIGS. 8A, 8B, 8C, and 8D illustrate various elements of example communication channel interfaces according to some embodiments of the present disclosure.

Figure 8A:
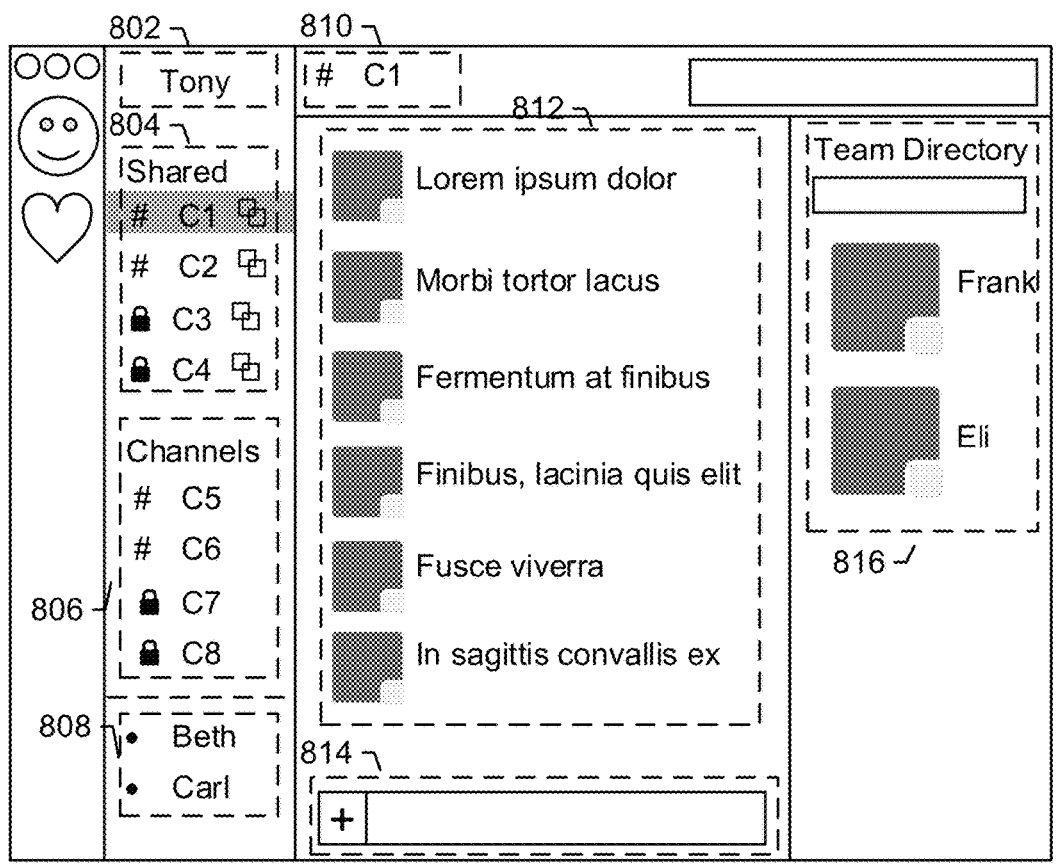

Referring now to FIG. 8A, an example communication channel interface 800A is shown. The communication channel interface 800A includes a user name box 802, indicating the current user account associated with the communication channel interface 800A.

The communication channel interface 800A also may also include a channel list pane, which may include an externally shared communication channel list subpane 804. The externally shared communication channel list subpane 804 allows a user to quickly and easily navigate all externally shared communication channels that the user has subscribed to. For example, as shown in FIG. 8A, the user Tony has subscribed to externally shared communication channels C1, C2, C3, and C4, which are indicated by an overlapping square symbol to the right of each channel name. Each group may set its preference as to the name of an externally shared communication channel in the externally shared communication channel list subpane 804.

The channel list pane of the communication channel interface 800A may further include an internally shared communication channel list subpane 806, which lists all internally shared communication channels that a user has subscribed to. In contrast to those listed in the externally shared communication channel list subpane 804, all channels in the internally shared communication channel list subpane 806 are shared with other users within the same group or organization.

A channel in the externally shared communication channel list subpane 804 or the internally shared communication channel list subpane 806 can be a private channel or a public channel. The status of the channel may be indicated by an icon to the left of the channel name. For example, as shown in the internally shared communication channel list subpane 806 of FIG. 8A, channels C5 and C6 each has a pound sign next to its name, which indicates that they are public channels; channels C7 and C8 each has a lock sign next to its name, which indicates that they are private channels.

The communication channel interface 800A further includes a channel title box 810 and a direct message pane 808. The direct message pane 808 lists all the members who share the same channel as the user. For example, as shown in the direct message pane 808 of FIG. 8A, the user may send a direct message to Beth or Carl, who share the same channel C1 as the user. In connection with the direct message pane 808, the communication channel interface 800A may further include a flexpane 816, which may display information such as member directory of a group. The member directory may be browsable, searchable, and filterable through the flexpane 816.

In some embodiments, the display of the member directory may be determined based on the retention settings. The retention setting may further determine which applications are installed on the channel, which features are enabled for the channel, and other preferences regarding which users are allowed to control the channel.

In addition, the communication channel interface 800A includes a channel messaging pane 812, which displays text, images, and other history data associated with the communication channel. In some embodiments, the history data may include changes to membership, such as when a user join or leave a channel, when an application is installed or removed from a channel.

In some embodiments, the viewing privilege settings of some content (i.e. who may view these content) in the channel messaging pane 812 may be specific to the user and hidden from public view. For example, when a user use a command to interact privately with an application or a bot, such activities may be hidden from the public view. A user may also choose to make such activities viewable by the public.

In some embodiments, the viewing privilege settings may be specific to the team and/or applications installed on the team. For example, when Tony from organization X wants to use a command, the command menu will only show commands from applications that have been installed on organization X.

Figure 8B:
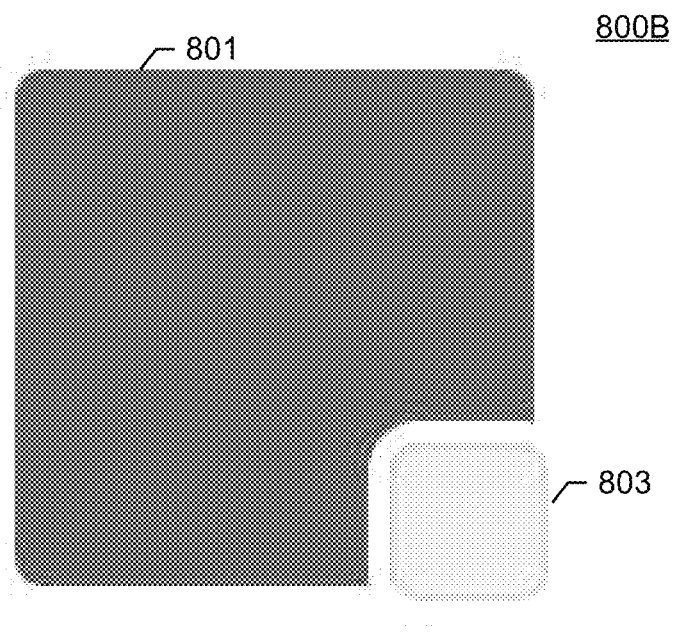

A user may use the channel input box 814 to contribute to the communication channel, which would be displayed in the channel messaging pane 812. The channel input box 814 may provide autocomplete function, which automatically recognizes user name, channel name, and other information as a user types in the channel input box 814. In some embodiments, the auto-complete bot may also recognize the names of applications and other bots to further interact with the channel. The channel input box 814 may also provide message input warnings when a user is in an externally shared communication channel, alerting the user that any information he or she contributed may be seen by members of another group or organization. Referring now to FIG. 8B, an example user icon 800B is shown. The user icon 800B may include a user avatar 801 and a group icon 803. The user avatar 801 may indicate the identity of a user, and the group icon 803 may indicate the group that the user is associated with. In some embodiments, the user avatar 801 may have a size of 72 px by 72 px, with 4 px rounded corners. The group icon 803 may have a size of 22 px by 22 px, with 4 px rounded corners, 1 px inner border, and 3 px outer border.

Figure 8C:
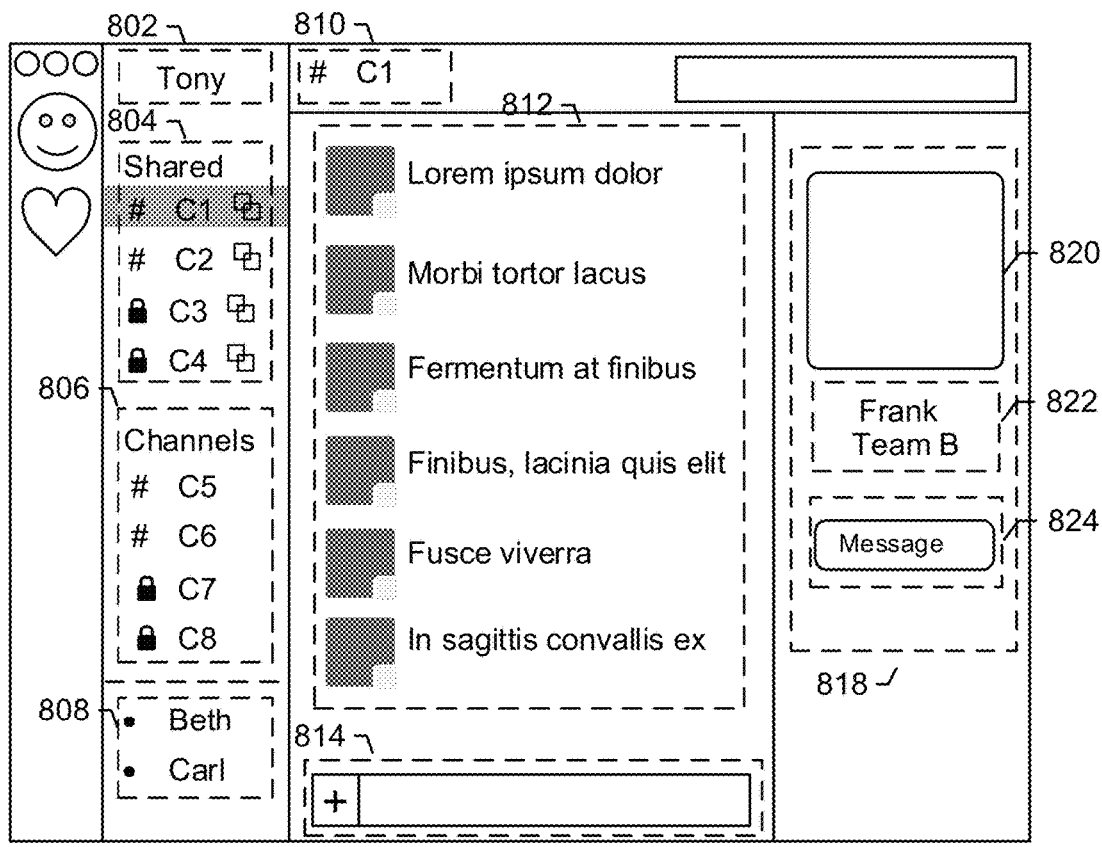

Referring now to FIG. 8C, an example communication channel interface 800C is shown. The communication channel interface 800C may include a group member profile card 818, which may further include a profile picture 820 of a group member, a group identification box 822 and function buttons 824. The group identification box 822 may include information such as the name of the group that the group member is associated with. The function buttons 824 may allow the user to perform various functions, such as sending a direct message to the group member.

Figure 8D:
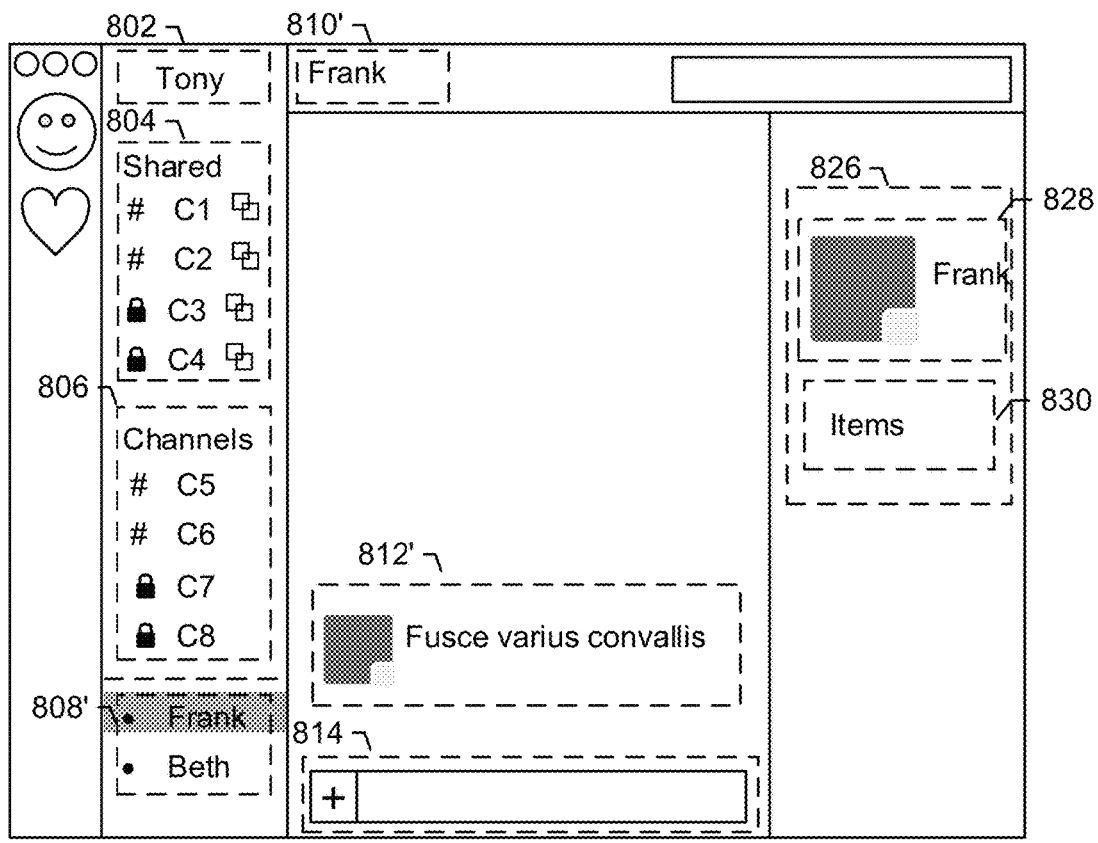

Referring now to FIG. 8D, the user interface 800D illustrates an example interface for direct messaging with a group member. The user interface 800D may include a member name box 810', which indicates the name of the group member with whom the user is direct messaging. The communication pane 812' shows direct messaging history between the user and the group member. The user interface 800D may further include a direct message profile pane 826, which may include a user information section 828 and a related information section 830. The direct message profile pane 826 enables a user to quickly and easily recognize basic information about the group member with whom the user is direct messaging.

Example Application Programming Interface (API) Design for Implementing Embodiments of the Present Disclosure In some embodiments, systems structured in accordance with embodiments of the present disclosure may provide Application Programming Interfaces (APIs) that enable configurability of applications and bots in an externally shared communication channel.

Existing systems are plagued by technical limitations. For example, some existing systems fail to roll up member teams in an externally shared communication channel, while others fail to emit events to users whose group-based communication channels are not stored on the same shard.

Various embodiments of the present disclosure provide technical improvements over existing systems. As described above, a shared communication channel shard may be generated to store data related to an externally shared communication channel. In some embodiments of the present disclosure, an events subscription table (e.g., "event_subscriptions_types") may be stored in the shared communication channel shard. The events subscription table stores information regarding whether to emit events to members in an externally shared communication channel. To solve the above-identified technical difficulties, the events subscription table may be updated to include a "resource_id" column and a "resource_type" column. The "resource_id" column stores the identification of the resource (e.g. event), and the "resource_type" column identifies the type of the resource (e.g., whether the event is subscribed by teams whose group-based communication channels are stored on different shards). By utilizing these two columns, embodiments of the present disclosure solve the issues of where and how to store consolidated event registration information for applications installed on a group-based communication channel. Continuing from the "Tony to Frank" example, the externally shared communication channel may utilize the "resource_type" column and the "resource_id" column to store information regarding whether organization X and/or organization Y is subscribed to a particular resource (i.e. event).

The programming code below provides alteration of the "event_subscriptions_types" table to include "resource_type" and "resource_id" columns:

```
ALTER TABLE event_subscriptions_types ADD COLUMN
resource_type varchar(25) NOT NULL AFTER team_id
```

```
ALTER TABLE event_subscriptions_types ADD COLUMN resource_id
bigint(20) UNSIGNED NOT NULL AFTER resource_type
ALTER TABLE event_subscriptions_types ADD COLUMN
ext_team_id bigint(20) UNSIGNED NOT NULL AFTER team_id
ALTER TABLE event_subscriptions_types DROP PRIMARY KEY,
ADD PRIMARY KEY event_subscription_id, team_id, event_type,
resource_type, resource_id)
```

In some embodiments of the present disclosure, a "channel_id" column and an "event_subscription_id" column may be added to the "event_subscriptions_types" table. The "channel_id" column identifies the group-based communication channel, and the "event_subscription_id" identifies the events that each group-based communication channel is subscribed to. Continuing from the "Tony to Frank" example, the "channel_id" column and the "event_subscription_id" column store information regarding what events each of organization X and organization Y has subscribed to.

Further, some embodiments of the present disclosure may also create a new table in the shared communication channel shard, such as "event_subscriptions_ext_shared," to separately store event subscription information for each team. The programming code below provides the creation of the "event_subscriptions_ext_shared" table.

```
CREATE TABLE 'event_subscriptions_ext_shared' (
  'subscription_team_id' bigint(20) UNSIGNED NOT NULL,
  'channel_id' bigint(20) UNSIGNED NOT NULL,
  'api_app_id' bigint(20) UNSIGNED NOT NULL,
  'event_type' varchar(255) NOT NULL
  PRIMARY KEY ('subscription_t_team_id', 'channel_id',
  'event_type')
) ENGINE=InnoDB DEFAULT CHARSET=utf8mb4;
```

Additional Implementation Details

Although example processing systems have been described in FIGS. 2 and 3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also referred herein to as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. In some instances, a computer may comprise a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiments or of what may be claimed, but rather as description of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying drawings do not necessarily require the particular order shown, or sequential order, to achieve desirable results, unless described otherwise. In certain implementations, multitasking and parallel processing may be advantageous.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the group-based communication platform disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

That which is claimed:

1. A computing system for creating a shared communication channel in a group-based communication platform, wherein the group-based communication platform comprises a plurality of database shards, and wherein the computing system comprises:

communications circuitry configured to:
receive, from a first client device associated with an initiator group identification, a shared communication channel generation query associated with the initiator group identification and a target group identification,
transmit, to a second client device associated with the target group identification, a shared communication channel acceptance request,
receive a shared communication channel acceptance notification,
transmit, to the first client device, a first externally shared group-based shared communication channel interface of the shared communication channel, and
transmit, to the second client device, a second externally shared group-based shared communication channel interface of the shared communication channel;

database circuitry in communication with the communications circuitry, wherein the database circuitry is configured to:
receive, from the communications circuitry, the shared communication channel generation query,
generate a shared communication channel shard, wherein the plurality of database shards comprises the shared communication channel shard, and wherein the shared communication channel shard is assigned a shared communication channel identification, a first set of shared communication channel attributes associated with the initiator group identification, and a second set of shared communication channel attributes associated with the target group identification, generate the shared communication channel acceptance request, wherein the shared communication channel acceptance request is associated with the shared communication channel identification, transmit, to the communications circuitry for transmission to the second client device associated with the target group identification, the shared communication channel acceptance request, and receive, from the communications circuitry, the shared communication channel acceptance notification, wherein the shared communication channel acceptance notification comprises an electronic approval to associate the shared communication channel identification with the target group identification;

referential table generation circuitry in communication with the communications circuitry, the database circuitry, and a main database, wherein the main database comprises a shard referential table, and wherein the referential table generation circuitry is configured to:
update the shard referential table based on the initiator group identification, the target group identification, the shared communication channel identification, the first set of shared communication channel attributes, and the second set of shared communication channel attributes; and interface generation circuitry in communication with the communications circuitry, the database circuitry, and the referential table generation circuitry, wherein the interface generation circuitry is configured to:
generate the first externally shared group-based shared communication channel interface of the shared communication channel based on the shared communication channel shard and the first set of shared communication channel attributes associated with the initiator group identification,
generate the second externally shared group-based shared communication channel interface of the shared communication channel based on the shared communication channel shard and the second set of shared communication channel attributes associated with the target group identification,
transmit, to the communications circuitry for transmission to the first client device, the first externally shared group-based shared communication channel interface of the shared communication channel, and
transmit, to the communications circuitry for transmission to the second client device, the second externally shared group-based shared communication channel interface of the shared communication channel.

2. The computing system of claim 1, wherein the plurality of database shards comprises a first database shard associated with the initiator group identification, wherein the plurality of database shards comprises a second database shard associated with the target group identification, wherein the shard referential table comprises a first referential connection between the initiator group identification and the first database shard, and wherein the shard referential table comprises a second referential connection between the target group identification and the second database shard.

3. The computing system of claim 2, wherein the referential table generation circuitry is configured to:
identify, based on the initiator group identification, the first referential connection in the shard referential table;
identify, based on the target group identification, the second referential connection in the shard referential table;
generate a third referential connection between the shared communication channel identification, the shared communication channel shard, the first referential connection, and the second referential connection; and
update the shard referential table to comprise the third referential connection.

4. The computing system of claim 1, wherein the communications circuitry is configured to receive, over the shared communication channel from a third client device associated with the initiator group identification, a message associated with a set of viewing privilege settings; and wherein the computing system further comprises message amplifier circuitry in communication with the communications circuitry, the database circuitry, the referential table generation circuitry, and the interface generation circuitry, wherein the message amplifier circuitry is configured to:
receive, from the communications circuitry, the message associated with the set of viewing privilege settings;
generate a general message based on the received message and the set of viewing privilege settings;
transmit, over the shared communication channel to a plurality of client devices based on the set of viewing privilege settings, the general message.

5. The computing system of claim 4, wherein the set of viewing privilege settings comprises a private viewing privilege setting, wherein each of the plurality of client devices is associated with the initiator group identification, and wherein the general message is not transmitted by the message amplifier circuitry to any client device associated with the target group identification.

6. The computing system of claim 5, wherein the general message is viewable in the first externally shared group-based shared communication channel interface to the first client device, and wherein the general message is not viewable in the second externally shared group-based shared communication channel interface to the second client device.

7. The computing system of claim 4, wherein the set of viewing privilege settings comprises a public viewing privilege setting, and wherein the plurality of client devices comprises the first client device and the second client device.

8. The computing system of claim 7, wherein the general message is viewable in the first externally shared group-based shared communication channel interface to the first client device, and wherein the general message is viewable in the second externally shared group-based shared communication channel interface to the second client device.

9. The computing system of claim 4, wherein the message is a first message; wherein the set of viewing privilege settings is a first set of viewing privilege settings; wherein the general message is a first general message; wherein the plurality of client devices is a first plurality of client devices; wherein the communications circuitry is configured to receive, over the shared communication channel from a fourth client device associated with the target group identification, a second message associated with a second set of viewing privilege settings; and wherein the message amplifier circuitry is configured to:
receive, from the communications circuitry, the second message;

generate a second general message based on the received second message and the second set of viewing privilege settings; and transmit, over the shared communication channel to a second plurality of client devices based on the second set of viewing privilege settings, the second general message.

10. The computing system of claim 9, wherein the second set of viewing privilege settings comprises a private viewing privilege setting, wherein each of the second plurality of client devices is associated with the target group identification, and wherein the second general message is not transmitted by the message amplifier circuitry to any client device associated with the initiator group identification.

11. The computing system of claim 10, wherein the second general message is not viewable in the first externally shared group-based shared communication channel interface to the first client device, and wherein the second general message is viewable in the second externally shared group-based shared communication channel interface to the second client device.

12. The computing system of claim 9, wherein the second set of viewing privilege settings comprises a public viewing privilege setting, and wherein the second plurality of client devices comprises the first client device and the second client device.

13. The computing system of claim 12, wherein the second general message is viewable in the first externally shared group-based shared communication channel interface to the first client device, and wherein the second general message is viewable in the second externally shared group-based shared communication channel interface to the second client device.

14. The computing system of claim 1, wherein the plurality of database shards comprises a first database shard associated with the initiator group identification; wherein the communications circuitry is configured to receive, over the shared communication channel from a third client device associated with the initiator group identification, a message associated with a set of viewing privilege settings; and wherein the database circuitry is configured to:

receive, from the communications circuitry, the message associated with the set of viewing privilege settings;

generate a storage message based on the received message and the set of viewing privilege settings; and store, in the first database shard, the storage message in association with the set of viewing privilege settings.

15. The computing system of claim 14, wherein the set of viewing privilege settings comprises a private viewing privilege setting, and wherein the database circuitry is configured to index the storage message in a separate index associated with the initiator group identification, wherein the separate index is accessible to any client device associated with the initiator group identification, and wherein the separate index is not accessible to any client device associated with the target group identification.

16. The computing system of claim 15, wherein the storage message is searchable in the first externally shared group-based shared communication channel interface by the first client device, and wherein the storage message is not searchable in the second externally shared group-based shared communication channel interface by the second client device.

17. The computing system of claim 14, wherein the set of viewing privilege settings comprises a public viewing privilege setting, and wherein the database circuitry is configured to index the storage message in a shared index associated with the initiator group identification and the target group identification, wherein the shared index is accessible to the first client device and the second client device.

18. The computing system of claim 17, wherein the storage message is searchable in the first externally shared group-based shared communication channel interface by the first client device, and wherein the storage message is searchable in the second externally shared group-based shared communication channel interface by the second client device.

19. A apparatus for creating a shared communication channel in a group-based communication platform, wherein the group-based communication platform comprises a plurality of database shards, and wherein the apparatus comprises:

communications circuitry configured to:
receive, from a first client device associated with an initiator group identification, a shared communication channel generation query associated with the initiator group identification and a target group identification, transmit, to a second client device associated with the target group identification, a shared communication channel acceptance request, receive a shared communication channel acceptance notification, transmit, to the first client device, a first externally shared group-based shared communication channel interface of the shared communication channel, and transmit, to the second client device, a second externally shared group-based shared communication channel interface of the shared communication channel;

database circuitry in communication with the communications circuitry, wherein the database circuitry is configured to:
receive, from the communications circuitry, the shared communication channel generation query, generate a shared communication channel shard, wherein the plurality of database shards comprises the shared communication channel shard, and wherein the shared communication channel shard is assigned a shared communication channel identification, a first set of shared communication channel attributes associated with the initiator group identification, and a second set of shared communication channel attributes associated with the target group identification, generate the shared communication channel acceptance request, wherein the shared communication channel acceptance request is associated with the shared communication channel identification, transmit, to the communications circuitry for transmission to the second client device associated with the target group identification, the shared communication channel acceptance request, and receive, from the communications circuitry, the shared communication channel acceptance notification, wherein the shared communication channel acceptance notification comprises an electronic approval to associate the shared communication channel identification with the target group identification;

referential table generation circuitry in communication with the communications circuitry, the database circuitry, and a main database, wherein the main database comprises a shard referential table, and wherein the referential table generation circuitry is configured to:

update the shard referential table based on the initiator group identification, the target group identification, the shared communication channel identification, the first set of shared communication channel attributes, and the second set of shared communication channel attributes; and interface generation circuitry in communication with the communications circuitry, the database circuitry, and the referential table generation circuitry, wherein the interface generation circuitry is configured to:

generate the first externally shared group-based shared communication channel interface of the shared communication channel based on the shared communication channel shard and the first set of shared communication channel attributes associated with the initiator group identification, generate the second externally shared group-based shared communication channel interface of the shared communication channel based on the shared communication channel shard and the second set of shared communication channel attributes associated with the target group identification, transmit, to the communications circuitry for transmission to the first client device, the first externally shared group-based shared communication channel interface of the shared communication channel, and transmit, to the communications circuitry for transmission to the second client device, the second externally shared group-based shared communication channel interface of the shared communication channel.

20. The apparatus of claim 19, wherein the plurality of database shards comprises a first database shard associated with the initiator group identification, wherein the plurality of database shards comprises a second database shard associated with the target group identification, wherein the shard referential table comprises a first referential connection between the initiator group identification and the first database shard, and wherein the shard referential table comprises a second referential connection between the target group identification and the second database shard.

21. The apparatus of claim 20, wherein the referential table generation circuitry is configured to:

identify, based on the initiator group identification, the first referential connection in the shard referential table;

identify, based on the target group identification, the second referential connection in the shard referential table;

generate a third referential connection between the shared communication channel identification, the shared communication channel shard, the first referential connection, and the second referential connection; and update the shard referential table to comprise the third referential connection.

22. The apparatus of claim 19, wherein the communications circuitry is configured to receive, over the shared communication channel from a third client device associated with the initiator group identification, a message associated with a set of viewing privilege settings; and wherein the apparatus further comprises message amplifier circuitry in communication with the communications circuitry, the database circuitry, the referential table generation circuitry, and the interface generation circuitry, wherein the message amplifier circuitry is configured to:

receive, from the communications circuitry, the message associated with the set of viewing privilege settings;

generate a general message based on the received message and the set of viewing privilege settings;

transmit, over the shared communication channel to a plurality of client devices based on the set of viewing privilege settings, the general message.

23. The apparatus of claim 22, wherein the set of viewing privilege settings comprises a private viewing privilege setting, wherein each of the plurality of client devices is associated with the initiator group identification, and wherein the general message is not transmitted by the message amplifier circuitry to any client device associated with the target group identification.

24. The apparatus of claim 23, wherein the general message is viewable in the first externally shared group-based shared communication channel interface to the first client device, and wherein the general message is not viewable in the second externally shared group-based shared communication channel interface to the second client device.

25. The apparatus of claim 22, wherein the set of viewing privilege settings comprises a public viewing privilege setting, and wherein the plurality of client devices comprises the first client device and the second client device.

26. The apparatus of claim 25, wherein the general message is viewable in the first externally shared group-based shared communication channel interface to the first client device, and wherein the general message is viewable in the second externally shared group-based shared communication channel interface to the second client device.

27. The apparatus of claim 22, wherein the message is a first message; wherein the set of viewing privilege settings is a first set of viewing privilege settings; wherein the general message is a first general message; wherein the plurality of client devices is a first plurality of client devices; wherein the communications circuitry is configured to receive, over the shared communication channel from a fourth client device associated with the target group identification, a second message associated with a second set of viewing privilege settings; and wherein the message amplifier circuitry is configured to:

receive, from the communications circuitry, the second message;

generate a second general message based on the received second message and the second set of viewing privilege settings; and transmit, over the shared communication channel to a second plurality of client devices based on the second set of viewing privilege settings, the second general message.

28. The apparatus of claim 27, wherein the second set of viewing privilege settings comprises a private viewing privilege setting, wherein each of the second plurality of client devices is associated with the target group identification, and wherein the second general message is not transmitted by the message amplifier circuitry to any client device associated with the initiator group identification.

29. A computer-implemented method for creating a shared communication channel in a group-based communication platform, wherein the group-based communication platform comprises a plurality of database shards, and wherein the computer-implemented method comprises:

receiving, by communications circuitry from a first client device associated with an initiator group identification, a shared communication channel generation query associated with the initiator group identification and a target group identification;

generating, by database circuitry in communication with the communications circuitry, a shared communication channel shard, wherein the plurality of database shards comprises the shared communication channel shard, and wherein the shared communication channel shard is assigned a shared communication channel identification, a first set of shared communication channel attributes associated with the initiator group identification, and a second set of shared communication channel attributes associated with the target group identification;

generating, by the database circuitry, a shared communication channel acceptance request, wherein the shared communication channel acceptance request is associated with the shared communication channel identification;

transmitting, by the communications circuitry to a second client device associated with the target group identification, the shared communication channel acceptance request;

receiving, by the communications circuitry, a shared communication channel acceptance notification, wherein the shared communication channel acceptance notification comprises an electronic approval to associate the shared communication channel identification with the target group identification;

updating, by referential table generation circuitry in communication with the communications circuitry, the database circuitry, and a main database, a shard referential table based on the initiator group identification, the target group identification, the shared communication channel identification, the first set of shared communication channel attributes, and the second set of shared communication channel attributes, wherein the main database comprises the shard referential table;

generating, by interface generation circuitry in communication with the communications circuitry, the database circuitry, and the referential table generation circuitry, a first externally shared group-based shared communication channel interface of the shared communication channel based on the shared communication channel shard and the first set of shared communication channel attributes associated with the initiator group identification;

generating, by the interface generation circuitry, a second externally shared group-based shared communication channel interface of the shared communication channel based on the shared communication channel shard and the second set of shared communication channel attributes associated with the target group identification;

transmitting, by the communications circuitry to the first client device, the first externally shared group-based shared communication channel interface of the shared communication channel; and transmitting, by the communications circuitry to the second client device, the second externally shared group-based shared communication channel interface of the shared communication channel.

30. A computer program product for creating a shared communication channel in a group-based communication platform, wherein the group-based communication platform comprises a plurality of database shards, and wherein the computer program product comprises at least one non-transitory computer-readable storage medium storing computer-executable program code instructions that, when executed by processing circuitry of a computing system, cause the computing system to:

receive, by communications circuitry from a first client device associated with an initiator group identification, a shared communication channel generation query associated with the initiator group identification and a target group identification;

generate, by database circuitry in communication with the communications circuitry, a shared communication channel shard, wherein the plurality of database shards comprises the shared communication channel shard, and wherein the shared communication channel shard is assigned a shared communication channel identification, a first set of shared communication channel attributes associated with the initiator group identification, and a second set of shared communication channel attributes associated with the target group identification;

generate, by the database circuitry, a shared communication channel acceptance request, wherein the shared communication channel acceptance request is associated with the shared communication channel identification;

transmit, by the communications circuitry to a second client device associated with the target group identification, the shared communication channel acceptance request;

receive, by the communications circuitry, a shared communication channel acceptance notification, wherein the shared communication channel acceptance notification comprises an electronic approval to associate the shared communication channel identification with the target group identification;

update, by referential table generation circuitry in communication with the communications circuitry, the database circuitry, and a main database, a shard referential table based on the initiator group identification, the target group identification, the shared communication channel identification, the first set of shared communication channel attributes, and the second set of shared communication channel attributes, wherein the main database comprises the shard referential table;

generate, by interface generation circuitry in communication with the communications circuitry, the database circuitry, and the referential table generation circuitry, a first externally shared group-based shared communication channel interface of the shared communication channel based on the shared communication channel shard and the first set of shared communication channel attributes associated with the initiator group identification;

generate, by the interface generation circuitry, a second externally shared group-based shared communication channel interface of the shared communication channel based on the shared communication channel shard and the second set of shared communication channel attributes associated with the target group identification;

transmit, by the communications circuitry to the first client device, the first externally shared group-based shared communication channel interface of the shared communication channel; and transmit, by the communications circuitry to the second client device, the second externally shared group-based shared communication channel interface of the shared communication channel.

* * * * *